US012437191B2

(12) United States Patent
Jha et al.

(10) Patent No.: US 12,437,191 B2
(45) Date of Patent: Oct. 7, 2025

(54) TRAINING NEURAL NETWORK MODEL BASED ON DATA POINT SELECTION

(71) Applicant: SONY GROUP CORPORATION, Tokyo (JP)

(72) Inventors: Abhishake Jha, Bangalore (IN); Shehnaz Mohamed, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 1348 days.

(21) Appl. No.: 17/097,958

(22) Filed: Nov. 13, 2020

(65) Prior Publication Data

US 2022/0156577 A1    May 19, 2022

(51) Int. Cl.
*G06N 3/08* (2023.01)
*G06F 17/18* (2006.01)
*G06F 18/2113* (2023.01)
*G06F 18/214* (2023.01)
*G06N 3/045* (2023.01)

(52) U.S. Cl.
CPC ............... *G06N 3/08* (2013.01); *G06F 17/18* (2013.01); *G06F 18/2113* (2023.01); *G06F 18/214* (2023.01); *G06N 3/045* (2023.01)

(58) Field of Classification Search
CPC ...... G06N 3/08; G06N 3/045; G06F 18/2113; G06F 18/214; G06F 17/18
See application file for complete search history.

(56) References Cited

U.S. PATENT DOCUMENTS

| 9,324,022 | B2 | 4/2016 | Williams et al. |
| 10,185,803 | B2 | 1/2019 | Frey et al. |
| 11,887,003 | B1* | 1/2024 | Bopardikar ............ G06N 20/00 |
| 11,941,531 | B1* | 3/2024 | Arik ......................... G06N 3/08 |
| 2018/0061439 | A1* | 3/2018 | Diamos ................. G10L 15/183 |
| 2018/0268255 | A1* | 9/2018 | Surazhsky ............. G06N 3/045 |
| 2019/0244680 | A1* | 8/2019 | Rolfe ..................... G06N 3/045 |

(Continued)

OTHER PUBLICATIONS

Koh et al., "Understanding Black-box Predictions via Influence Functions," arXiv:1703.04730v2 [stat.ML] Jul. 10, 2017 (Year: 2017).*

(Continued)

*Primary Examiner* — Miranda M Huang
*Assistant Examiner* — Yao David Huang
(74) *Attorney, Agent, or Firm* — CHIP LAW GROUP

(57) ABSTRACT

An electronic device includes a memory to store neural network model trained for classification tasks of real-time applications. The neural network model is trained with plurality of training data points. The electronic device includes circuitry to retrieve a plurality of external data points. The electronic device applies the neural network model on the plurality of external data points to determine a plurality of impact scores for each external data point. The plurality of impact scores indicates amount of contribution of each training data point towards a prediction of each external data point. The electronic device selects a set of external data points based on the plurality of impact scores. The electronic device updates the plurality of training data points with the set of external data points to generate a second plurality of training data points and re-trains the neural network model based on the second plurality of training data points.

19 Claims, 11 Drawing Sheets

(56) References Cited

U.S. PATENT DOCUMENTS

| | | | |
|---|---|---|---|
| 2020/0044852 A1* | 2/2020 | Streit | G06N 3/08 |
| 2020/0151570 A1* | 5/2020 | Ravi | G06N 3/048 |
| 2021/0012156 A1* | 1/2021 | Vijaykeerthy | G06N 3/084 |
| 2021/0124906 A1* | 4/2021 | Srivastava | G06V 10/764 |
| 2021/0271809 A1* | 9/2021 | Huang | G06F 40/216 |
| 2022/0222534 A1* | 7/2022 | Dai | G06N 3/044 |

OTHER PUBLICATIONS

Garima et al., "Estimating Training Data Influence by Tracking Gradient Descent," arXiv:2002.08484v2 [cs.LG] Jul. 13, 2020 (Year: 2020).*

Sharchilev et al., "Finding Influential Training Samples for Gradient Boosted Decision Trees," Proceedings of the 35th International Conference on Machine Learning, Stockholm, Sweden, PMLR 80, 2018 (Year: 2018).*

Chen et al., "Multi-Stage Influence Function," arXiv:2007.09081v1 [cs.LG] Jul. 17, 2020 (Year: 2020).*

Jia et al., "Towards Efficient Data Valuation Based on the Shapley Value," arXiv:1902.10275v3 [cs.LG] Aug. 17, 2020 (Year: 2020).*

* cited by examiner

TRAINING NEURAL NETWORK MODEL BASED ON DATA POINT SELECTION

REFERENCE

None

FIELD

Various embodiments of the disclosure relate to training of a neural network model. More specifically, various embodiments of the disclosure relate to an electronic device and a method for training of the neural network model based on external data point selection.

BACKGROUND

Recent advancements in the field of artificial intelligence have led to development of various techniques of training artificial neural network models (for example, a deep neural network (DNN) model and a convolutional neural network (CNN) model). In certain situations, a neural network model may be iteratively trained to improve existing predictive performance of the neural network model. However, the training of the neural network model may be a computationally expensive and a time-consuming task. Moreover, usage of inappropriate external data to train or re-train the neural network model may deteriorate the existing performance of the neural network model and further increase training time of the neural network model. Therefore, there exists a need for a system which may control (i.e. minimize) the training time while maintaining high accuracy for the neural network model.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method of training a neural network model based on data point selection, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
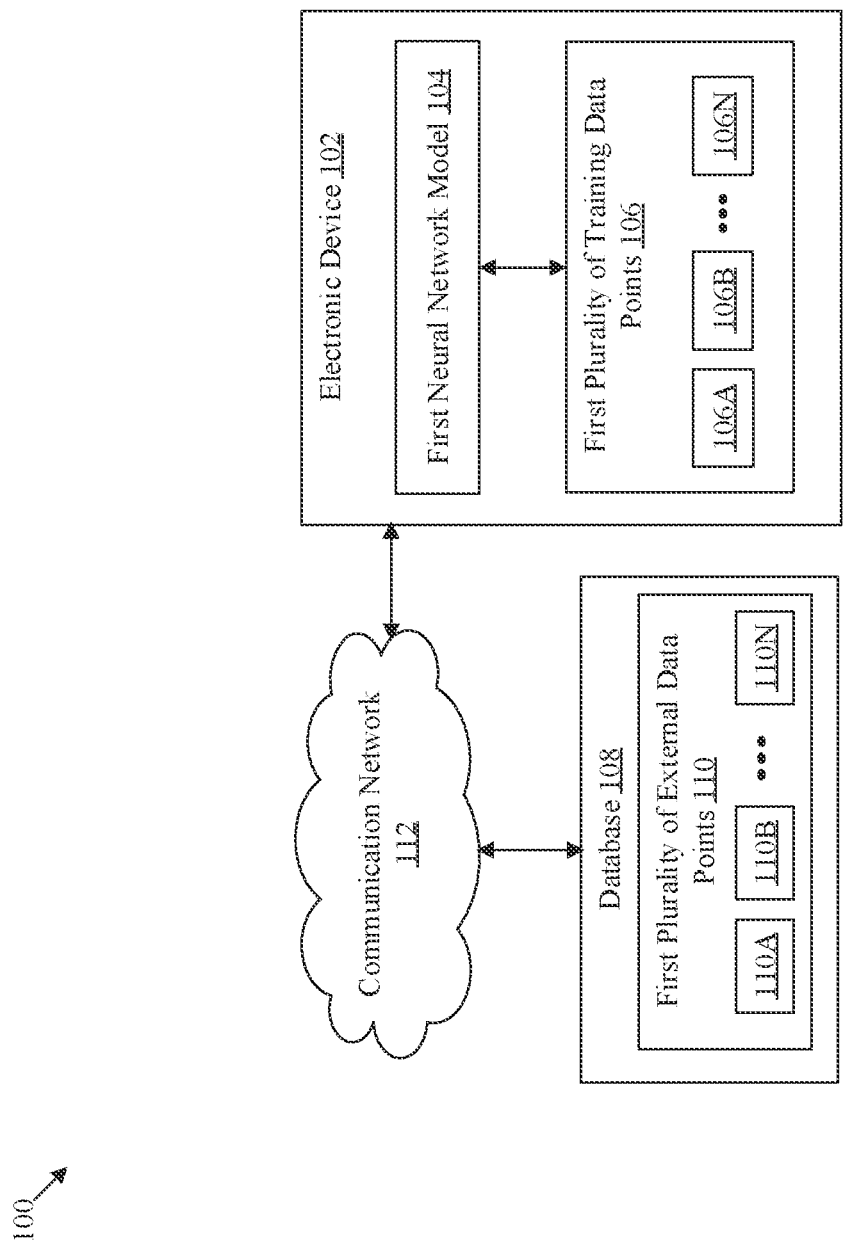
FIG. 1 is a block diagram that illustrates an exemplary network environment for re-training of a first neural network model, in accordance with an embodiment of the disclosure.

The following described implementations may be found in the disclosed electronic device and method to train a first neural network model. Exemplary aspects of the disclosure provide an electronic device that may include the first neural network model trained for a classification task of a real-time application. The first neural network model may be trained (for example, for prediction or classification of different images) with a first plurality of training data points (for example, but not limited to, images of different breeds of dogs and certain images of other objects, such as, birds or humans). However, all training data points of the first plurality of training data points may not be best training data points for the first neural network model. The electronic device may be configured to determine an impact score (for example, a third plurality of impact scores) for each of the first plurality of training data points. In some embodiments, the electronic device may be configured to update the first plurality of training data points by removal of a set of training data points from the first plurality of training data points based on the determined impact score of each of the first plurality of training data points. The removal of the set of training data points may lead to data cleaning of the first neural network model for the set of training data points, for which the determined impact score may not meet a predefined selection criteria.

The electronic device may be configured to retrieve a first plurality of external data points (for example, different images of different dogs and certain images of other objects, such as, birds or humans which may be unknown to the trained first neural network model), which may be different from the first plurality of training data points on which the first neural network model may be trained. The first plurality of external data points may correspond to external data for the first neural network model. The electronic device may further be configured to apply the first neural network model on the first plurality of external data points to determine a first plurality of impact scores for each of the first plurality of external data points. The first plurality of impact scores may indicate a first amount of contribution of each of the first plurality of training data points of the first neural network model towards prediction of each of the first plurality of external data points.

In other words, the first amount of contribution may indicate an influence of each of the first plurality of training data points (i.e. images or other data types on which the first neural network model is already trained) for the prediction or classification of each of the first plurality of external data points (i.e. images or other data types which may correspond to external data which may be unknown to the first neural network model). In accordance with an embodiment, the first amount of contribution may relate to an amount of contribution of features of each of the first plurality of training data points that may have contributed towards the prediction of each of the first plurality of external data points. For example, for the first neural network model trained to predict a dog from the first plurality of external data points (such as images), the features may include, but are not limited to, a facial structure of the dog, a size of the dog, and a height of the dog. Each of the first plurality of impact scores may range from "0" to "1".

The electronic device may be further configured to select a first set of external data points from the first plurality of external data points based on the determined first plurality of impact scores for each of the first plurality of external data points. The first plurality of impact scores of each of the selected first set of external data points may be more than the first plurality of impact scores of remaining external data points in the first plurality of external data points. In an embodiment, the first plurality of impact scores of the selected first set of external data points may be higher than an impact score threshold or may be within a particular range of impact scores (such as Top N). Furthermore, the electronic device may be configured to update the first plurality of training data points with the selected first set of external data points to generate a second plurality of training data points (i.e. new training data points). The generated second plurality of training data points may include the first plurality of training data points as well as the selected set of external data points. The electronic device may be further configured to re-train the first neural network model with the generated second plurality of training data points.

Thus, the electronic device of the present disclosure may enable determination of the first plurality of impact scores that may be used in the selection of the first set of external data points from the first plurality of external data points, for re-training of the first neural network model. The first plurality of external data points (i.e. unknown to the first neural network model) may thereby be prioritized or filtered, to select the first set of external data points (i.e. with higher impact score) for the re-training of the first neural network model, instead of usage of all external data points in the first plurality of external data points for the re-training. Further, the selected first set of external data points may be more effective for the re-training of the first neural network model, as such external data points may be selected based on the determined impact scores for the external data points, instead of random selection. The first set of external data points (i.e. say of higher impact scores) may thus be utilized for effective re-training of the first neural network model, which may improve an existing performance and accuracy of the first neural network model. Further, the prioritization of the first plurality of external data points and thereby the selection of the first set of external data points may lead to a reduction of the number of external data points, thereby reducing a cost and time to re-train the first neural network model. Therefore, the disclosed electronic device may provide cost effective as well as time efficient re-training of the first neural network model based on the selection of the first set of external data points (i.e. external data).

In another embodiment, the electronic device may iteratively train the first neural network model (for example, as a dynamic tracking of the training of the first neural network model) for one or more epochs of a plurality of epochs (i.e. total number of predefined epochs) to generate a second neural network model. The second neural network model trained on one or more epochs, may perform better prediction than the first neural network model. The electronic device may determine an impact score for each of the first plurality of training data points of the generated second neural network model trained for the one or more epochs. The impact score may indicate an amount of contribution of each of the first plurality of training data points of the generated second neural network model towards a prediction of each of the first plurality of training data points. The electronic device may re-select the generated second neural network model, as the first neural network model for training for others (i.e. remaining epochs) of the plurality of epochs, based on a comparison between the determined impact score and a training impact threshold. The electronic device may iteratively control the training of the first neural network model for each of the one or more epochs of the remaining epochs, to obtain the second neural network model (as a final trained neural network model) based on the comparison. In an example, when the determined impact score for each or a majority of the first plurality of training data points exceeds the training impact threshold, the electronic device may obtain the final neural network model (as the trained second neural network model) and stop the iterative training for the remaining epochs of the plurality of epochs. Thus, the dynamic tracking based on the impact determination, performed by the disclosed electronic device 102 may lead to a reduction in a number of epochs required to train the first neural network model and thereby speed-up the training process to provide the final neural network model with expected accuracy.

FIG. 1 is a block diagram that illustrates an exemplary network environment for re-training of a first neural network model, in accordance with an embodiment of the disclosure. With reference to FIG. 1, there is shown a network environment 100. The network environment 100 may include an electronic device 102. The electronic device 102 may further include a first neural network model 104 and a first plurality of training data points 106. The first plurality of training data points 106 may include a first training data point 106A, a second training data point 106B, . . . and an Nth training data point 106N. As shown in FIG. 1, the network environment 100 may further include a database 108. The database 108 may include a first plurality of external data points 110. The first plurality of external data points 110 may include a first external data point 110A, a second external data point 110B, . . . and an Nth external data point 110N. Furthermore, the network environment 100 may include a communication network 112. The electronic device 102 may be communicatively coupled to the database 108, via the communication network 112.

The electronic device 102 may include suitable logic, circuitry, code, and/or interfaces that may be configured to store the first neural network model 104 in a memory (shown in FIG. 2) of the electronic device 102. Further, the electronic device 102 may determine a third plurality of impact scores for the first plurality of training data points 106 and a first plurality of impact scores for each of the first plurality of external data points 110. The electronic device 102 may be further configured to re-train the first neural network model 104 based on the determined third plurality of impact score for each of the first plurality of training data points 106 and the first plurality of impact scores for each of the first plurality of external data points 110. Examples of the electronic device 102 may include, but are not limited to, artificial intelligent (AI) machine, a computing device, a smartphone, a cellular phone, a mobile phone, a gaming device, a mainframe machine, a server, a computer workstation, a tablet computer, a laptop computer, a desktop computer, and/or a consumer electronic (CE) device. In an embodiment, the first neural network model 104 may not be stored in the memory of the electronic device 102, but stored in the database 108 communicably coupled to the electronic device 102, via the communication network 112.

The first neural network model 104 may be a computational network or a system of artificial neurons, arranged in a plurality of layers, as nodes. The plurality of layers of the first neural network model 104 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the first neural network model 104. Outputs of each hidden layer may be coupled to inputs of at least one node in other layers of the first neural network model 104. Node(s) in the final layer may receive inputs from at least one hidden layer to output a result. The number of layers and the number of nodes in each layer may be determined from hyper-parameters of the first neural network model 104. Such hyper-parameters may be set before or while training the first neural network model 104 on a training dataset, such as the first plurality of training data points 106.

Each node of the first neural network model 104 may correspond to a mathematical function (e.g., a sigmoid function or a rectified linear unit) with a set of parameters, tunable while training of the first neural network model 104. The set of parameters may include, for example, a weight parameter, a regularization parameter, and the like. Each node may use the mathematical function to compute an output based on one or more inputs from nodes in other layer(s) (e.g., previous layer(s)) of the first neural network model 104. All or some of the nodes of the first neural network model 104 may correspond to same or a different mathematical function.

In training of the first neural network model 104, one or more parameters of each node of the first neural network model 104 may be updated based on whether an output of the final layer for a given input (from the training dataset) matches a correct result based on a loss function or not for the first neural network model 104. The above process may be repeated for the same or a different input till a minima of loss function may be achieved and a training error may be minimized. Several methods for training are known in art, for example, gradient descent, stochastic gradient descent, batch gradient descent, gradient boost, meta-heuristics, and the like.

The first neural network model 104 may include electronic data, such as, for example, a software program, code of the software program, libraries, applications, scripts, or other logic or instructions for execution by a processing device, such as, circuitry of the electronic device 102. The first neural network model 104 may include code and routines configured to enable a computing device, such as, the electronic device 102, to perform one or more operations for classification of one or more inputs to one or more output labels associated with a real-time application. The first neural network model 104 may be trained for a classification task of the real-time application. Examples of the real-time application may include, but are not limited to, an image recognition or classification application, a speech recognition application, a text recognition application, a malware detection application, an autonomous vehicle application, an anomaly detection application, a machine translation application, pattern recognition from different digital signals, such as, but not limited to, electrical bio signals, motion data, and depth data. Additionally, or alternatively, the first neural network model 104 may be implemented using hardware including a processor, a microprocessor (e.g., to perform or control performance of one or more operations), a field-programmable gate array (FPGA), or an application-specific integrated circuit (ASIC). Alternatively, in some embodiments, the first neural network model 104 may be implemented using a combination of hardware and software.

Examples of the first neural network model 104 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the first neural network model 104 may include numerical computation techniques using data flow graphs. In certain embodiments, the first neural network model 104 may be based on a hybrid architecture of multiple Deep Neural Networks.

In one or more embodiments, the first plurality of training data points 106 may correspond to, but is not limited to, image data, audio data, text data or three-dimensional (3D) data. In an embodiment, the first plurality of training data points 106 may correspond to electrical signals. The first neural network model 104 may be trained with the first plurality of training data points 106. In an example, the first neural network model 104 may be trained to predict an object in an image, such as an animal (e.g. a dog). In such as case, the first plurality of training data points 106 may be images of the different types of dogs. For example, the first training data point 106A may be an image of a dog of a first breed, the second training data point 106B may be an image of the dog of a second breed, . . . and the Nth training data point 106N may be an image of the dog of an Nth breed.

The database 108 may comprise suitable logic, circuitry, interfaces, and/or code that may be configured to store the first plurality of external data points 110 related to the real-time application. The electronic device 102 may receive the first external data point 110A, the second external data point 110B, . . . and the Nth external data point 110N from the database 108. Further, the first plurality of external data points 110 may be used to test or re-train the first neural network model 104 for the real-time application. The first plurality of external data points 110 may be unknown to the trained first neural network model 104. Therefore, the first plurality of external data points 110 may be referred as external data (or test data) on which the first neural network model 104 may not be trained. The database 108 may be a relational or a non-relational database that may include the first plurality of external data points 110. Also, in some cases, the database 108 may be stored on a server, such as a cloud server or may be cached and stored on the electronic device 102. The server of the database 108 may be configured to receive a request to provide the first plurality of external data points 110 from the electronic device 102, via the communication network 112. In response to such request, the server of the database 108 may be configured to retrieve and provide the first plurality of external data points 110 (or any of the first external data point 110A, the second external data point 110B, . . . or the Nth external data point 110N) to the electronic device 102, via the communication network 112. In some embodiments, the database 108 may be configured to store the pre-trained first neural network model 104 for the particular real-time applications. In some embodiments, the database 108 may store the first plurality of impact scores for each of the first plurality of external data points 110 or the third plurality of impact score for each of the first plurality of training data points 106. Additionally, or alternatively, the database 108 may be implemented using hardware including a processor, a microprocessor (e.g., to perform or control performance of one or more operations), a field-programmable gate array (FPGA), or an application-specific integrated circuit (ASIC). In some other instances, the database 108 may be implemented using a combination of hardware and software.

The first plurality of external data points 110 may be utilized to determine a predictability score of the first neural network model 104. The first plurality of external data points 110 may correspond to one of the image data, the audio data, the text data, or three-dimensional (3D) data. In an embodiment, the first plurality of external data points 110 may correspond to electrical signals. For example, the first plurality of external data points 110 may be provided to the first neural network model 104 to determine the predictability score for the first plurality of external data points 110. For example, the first external data point 110A may be an image of a dog of a first breed, the second external data point 110B may be an image of a dog of a second breed, . . . and the Nth external data point 110N may be an image of a bird. The Nth external data point 110N (such as, an image that does not include a dog) may be provided to the first neural network model 104 to ascertain that the first neural network model 104 may be able to determine an absence of the dog in the image or not (such as in the case of the Nth external data point 110N).

The communication network 112 may include a communication medium through which the electronic device 102 and the database 108 may communicate with each other. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth® (BT) communication protocols.

In operation, the electronic device 102 may receive a request to re-train the first neural network model 104 based on the first plurality of external data points 110 (i.e. external data). The first neural network model 104 may be trained with the first plurality of training data points 106. The electronic device 102 may be configured to select a set of training data points from the first plurality of training data points 106 based on a third plurality of impact scores determined for each of the first plurality of training data points 106. The electronic device 102 may further update the first plurality of training data points 106 with removal of the selected set of training data points (i.e. from the first plurality of training data points 106), to further generate a fourth plurality of training data points. The impact score for each of the selected set of training data points may not meet a predefined selection criteria. The fourth plurality of training data points may be utilized by the electronic device 102 to re-train the first neural network model 104. The details of the re-training of the first neural network model 104 with the fourth plurality of training data points performed by the electronic device 102 is described, for example, in FIG. 3. The removal of the selected set of training data points from the first plurality of training data points 106 may be referred as data cleaning of the trained first neural network model 104 based on the impact score determination.

Furthermore, the electronic device 102 may be configured to send a request to the database 108 to retrieve the first plurality of external data points 110 from the database 108, via the communication network 112. In some embodiments, the first plurality of external data points 110 may be stored in the memory of the electronic device 102. The electronic device 102 may be further configured to apply the first neural network model 104 on the first plurality of external data points 110 to determine the first plurality of impact scores for each of the first plurality of external data points 110. The first plurality of impact scores may indicate the first amount of contribution of each of the first plurality of training data points 106 of the first neural network model 104 towards prediction of each of the first plurality of external data points 110. In an example, the first neural network model 104 may be trained for the prediction of the dog in an external image (such as the first external data point 110A) fed to the first neural network model 104. The first neural network model 104 may be trained on the different images of dogs, such as dogs of different breeds and certain images of other objects, such as, birds or humans. In such a case, the first plurality of training data points 106, such as the first training data point 106A, the second training data point 106B, . . . and the Nth training data point 106N may be the different images of the dogs and certain images of other objects, such as, birds or humans. The electronic device 102 may retrieve the first external data point 110A and determine an impact (i.e. contribution or influence) of each of the first plurality of training data points 106 on the first external data point 110A (or towards the prediction or classification of the first plurality of external data points 110 with a label "dog"). The determined impact may correspond to an impact score for the first external data point 110A. Similarly, the electronic device 102 may determine the first plurality of impact scores for each of the first plurality of external data points 110. The determination of the first plurality of impact scores for each of the first plurality of external data points 110 performed by the electronic device 102 is described, for example, in FIG. 4.

The electronic device 102 may be further configured to select a first set of data points from the first plurality of external data points 110 based on the determined first plurality of impact scores. In an exemplary embodiment, an impact score for the first external data point 110A may be "0.8", an impact score for the second external data point 110B may be "0.3", . . . and an impact score for the Nth external data point 110N may be "0.7". The electronic device 102 may select the first external data point 110A and the Nth external data point 110N from the first plurality of external data points 110 as the first set of external data points. The electronic device 102 may select the first external data point 110A and the Nth external data point 110N, as the impact score for the first external data point 110A and the impact score for the Nth external data point 110N may be substantially more than the impact score for the second external data point 110B and/or more than an impact score threshold (e.g., "0.55" defined for the first neural network model 104 or for the classification task). The details of the selection of the first set of external data points from the first plurality of external data points 110 performed by the electronic device 102 is described, for example, in FIGS. 3 and 4.

The electronic device 102 may be further configured to update the first plurality of training data points 106 with the selected first set of external data points to generate a second plurality of training data points (not shown in FIG. 1). The second plurality of training data points may include the first plurality of training data points 106 and the selected first set of external data points. The electronic device 102 may further re-train the first neural network model 104 with the generated second plurality of training data points. The details of the re-training of the first neural network model 104 performed by the electronic device 102 is described, for example, in FIGS. 3 and 4. As the selection of the first set of external data points performed by the electronic device 102 is based on the first plurality of impact scores, the selected first set of external data points may be more effective for the re-training of the first neural network model 104, than the unselected external data points in the first plurality of external data points 110. Further, the selection of the first set of external data points from the first plurality of external data points 110 may reduce the number of data points that may correspond to best external data points used for re-training of the first neural network model 104. Thus, the re-training of the first neural network model 104 with the selected first set of external data points may be efficient to provide a neural network model with high accuracy data prediction and classification.

In accordance with an embodiment, the electronic device 102 may be further configured to apply a plurality of realistic variations (such as a plurality of augmentation techniques) to one or more external data points of the first plurality of external data points 110 to generate a second plurality of external data points. The electronic device 102 may further select a second set of external data points from the generated second plurality of external data points based on a second plurality of impact scores determined for the second plurality of external data points. The electronic device 102 may generate a third plurality of training data points that may include the first plurality of training data points 106 and the selected second set of external data points. The third plurality of training data points may be utilized to re-train the first neural network model 104. The details of the re-training of the first neural network model 104 with the third plurality of training data points performed by the electronic device 102 is described, for example, in FIG. 5.

In accordance with an embodiment, the electronic device 102 may be further configured to dynamically track the training of the first neural network model 104. The electronic device 102 may be configured to select the first neural network model 104 for training for a plurality of epochs (for example predefined number of epochs), while training the first neural network model 104 based on the first plurality of training data points 106. The electronic device 102 may be further configured to control a set of operations (i.e. dynamic tracking) for training the selected first neural network model 104 for one or more epochs out of the plurality of epochs based on impact score determination. The details of the dynamic tracking of the training of the first neural network model 104 performed by the electronic device 102 is described, for example, in FIG. 6.

In accordance with an embodiment, the electronic device 102 may be further configured to dynamically select a neural network model from a plurality of second neural network models in production and staging phase of the first neural network model 104. The electronic device 102 may select the neural network model from the plurality of second neural network models based on a plurality of impact scores determined for a second external data point with respect to the plurality of second neural network models. In an embodiment, the electronic device 102 may switch the first neural network model 104 from the production phase with the selected neural network model in the staging phase. The details of the selection of the neural network model from the plurality of second neural network models, and switching of the selected neural network model with the first neural network model 104 performed by the electronic device 102, is described, for example, in FIG. 7A. Moreover, the electronic device 102 may add the selected neural network model in the production phase along with the first neural network model 104. The details of the addition of the selected neural network model in the production phase, is described, for example, in FIG. 7B.

Figure 2:
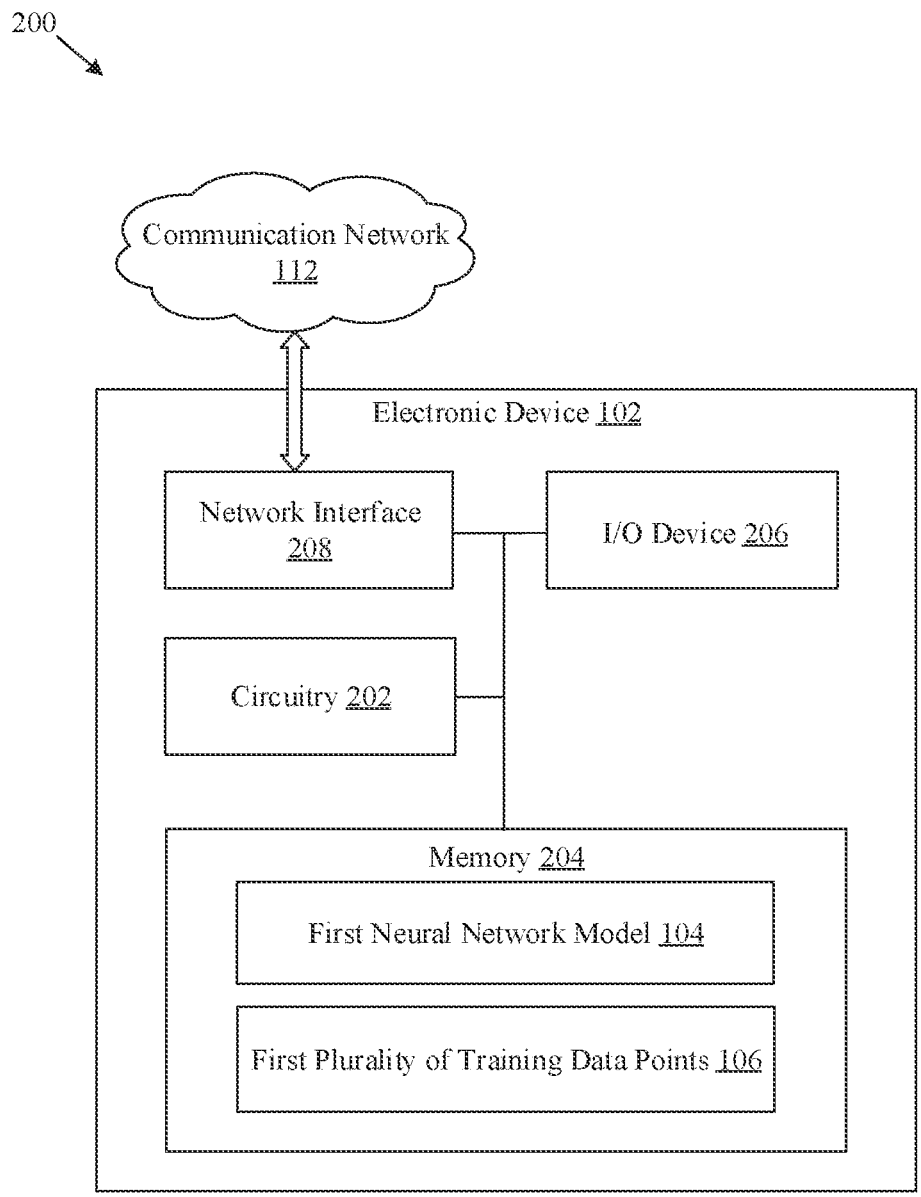
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 1 is described in conjunction with elements from FIG. 1. With reference to FIG. 2, there is shown a block diagram 200 of electronic device 102. The electronic device 102 may include the first neural network model 104, such that the first neural network model 104 may be trained with the first plurality of training data points 106. The electronic device 102 may further include circuitry 202, a memory 204, an input/output (I/O) device 206, and a network interface 208, through which the electronic device 102 may be connected to the communication network 112.

The circuitry 202 may include suitable logic, circuitry, and/or interfaces that may be configured to execute program instructions associated with different operations to be executed by the electronic device 102. For example, some of the operations may include re-training the first neural network model 104 based on the determination of the first plurality of impact scores and the third plurality of impact scores. The circuitry 202 may be further configured to dynamically track the training of the first neural network model 104. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and/or interfaces that may be configured to store the one or more instructions to be executed by the circuitry 202. In accordance with an embodiment, the memory 204 may be configured to store the first neural network model 104 trained for the classification task of the real-time application. The memory 204 may be further configured to store the first plurality of training data points 106. In some embodiments, the memory 204 may be configured to store the first plurality of external data points 110. In an embodiment, the memory 204 may store the first plurality of impact scores determined for the first plurality of external data points 110, and store the first impact score threshold which may be used to select the first set of external data points (such as the first external data point 110A and the second external data point 110B) from the first plurality of external data points 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, code, and/or interfaces that may be configured to receive an input from a user and provide an output based on the received input. For example, the electronic device 102 may receive the input to initiate the selection of the first set of external data points from the first plurality of external data points 110, via the I/O device 206. In another example, the electronic device 102 may output the determined impact scores for the selected first set of external data points, via I/O device 206. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The network interface 208 may include suitable logic, circuitry, code, and/or interfaces that may be configured to facilitate communication between the circuitry 202 and the database 108, via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the electronic device 102 in FIG. 2 may also include other suitable components or systems, in addition to the components or systems which are illustrated herein to describe and explain the function and operation of the present disclosure. A detailed description for the other components or systems of the electronic device 102 has been omitted from the disclosure for the sake of brevity. The operations of the circuitry 202 are further described, for example, in FIGS. 1, 3, 4, 5, 6, 7A, 7B, 8, and 9.

Figure 3:
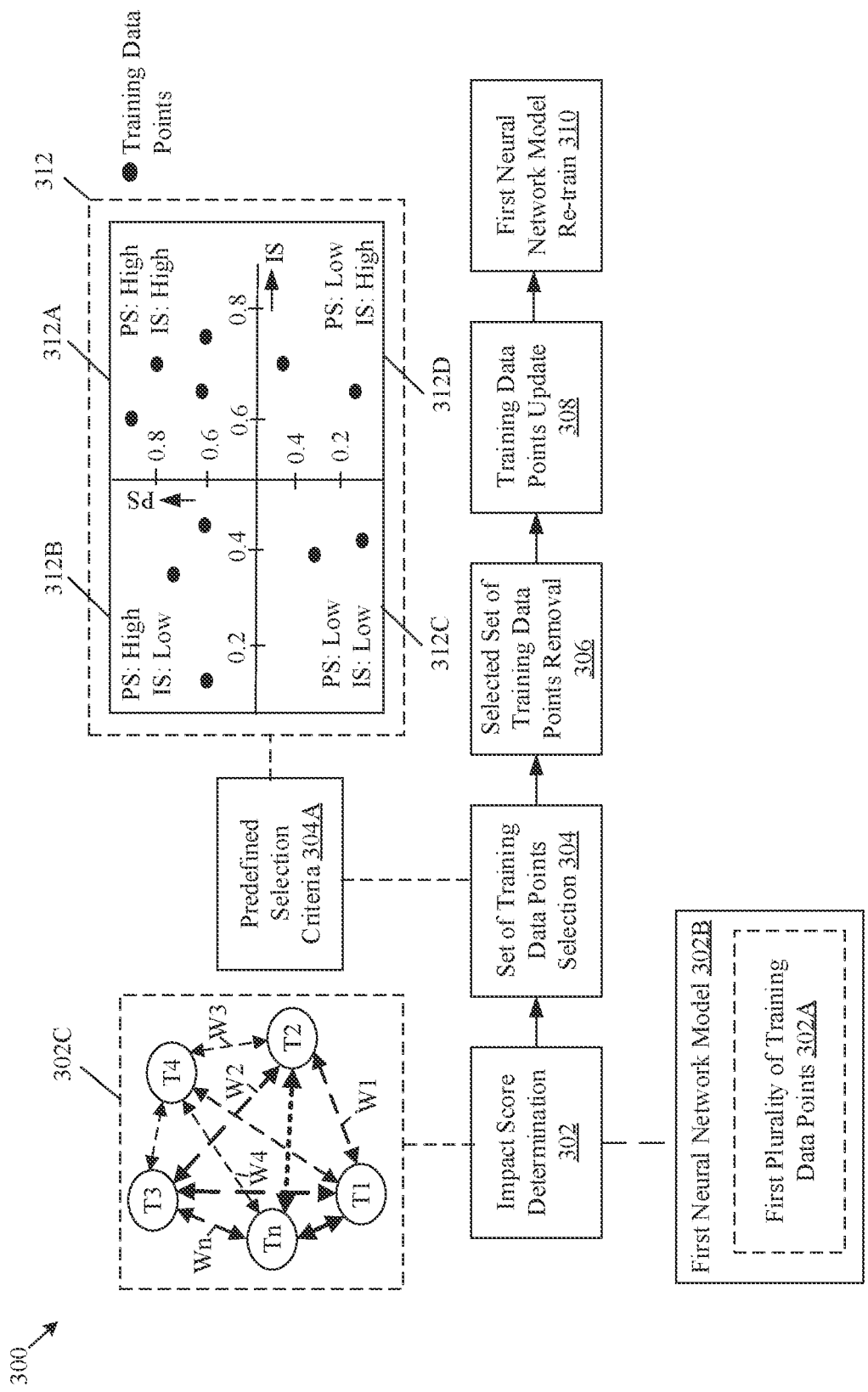
FIG. 3 is a diagram that illustrates exemplary operations for re-training the first neural network model of FIG. 1 based on selection of training data points, in accordance with an embodiment of the disclosure.

FIG. 3 is a diagram that illustrates exemplary operations for re-training the first neural network model of FIG. 1 based on selection of training data points, in accordance with an embodiment of the disclosure. FIG. 3 is explained in conjunction with elements from FIGS. 1 and 2. With reference to FIG. 3, there is shown a diagram 300 to depict exemplary operations from 302 to 310. The exemplary operations illustrated in the diagram 300 may start at 302 and may be performed by any computing system, apparatus, or device, such as, by the electronic device 102 of FIG. 1 or the circuitry 202 of FIG. 2.

At 302, a third plurality of impact scores may be determined. In accordance with an embodiment, the circuitry 202 may be configured to determine the third plurality of impact scores for each training data point of the first plurality of training data points 302A of a first neural network model 302B (i.e. similar to the first neural network model 104 in FIG.1). The first neural network model 302B may be trained for a classification task of a real-time application. In accordance with an embodiment, the real-time application may comprise an image classification, a speech recognition, or a text recognition task that may be performed by the first neural network model 302B. In accordance with an embodiment, the first neural network model 302B may be trained on the first plurality of training data points 302A (for example, dog images) for recognition of different objects in a first plurality of external data points (for example, test data points, not shown in FIG. 3). In another example, the first neural network model 302B may recognize different audio samples in the first plurality of external data points to identify a source (e.g., a human-speaker) of the audio sample.

The circuitry 202 may determine the third plurality of impact scores for each training data point of the first plurality of training data points 302A by application of the first neural network model 302B on each training data point of the first plurality of training data points 302A. The circuitry 202 may determine the third plurality of impact scores for each training data point of the first plurality of training data points 302A by comparison of features of each training data point with corresponding features of all training data points in the first plurality of training data points 302A. The determined third plurality of impact scores may indicate a third amount of contribution (or influence) of each of the first plurality of training data points 302A of the first neural network model 302B towards prediction of each of the first plurality of training data points 302A. In other words, determined third plurality of impact scores may indicate that how much each training data point contributes or impacts in the prediction of another training data point in the first plurality of training data points 302A.

In accordance with an embodiment, the circuitry 202 may be configured to generate a first graphical representation 302C that may be indicative of a relation between each training data point of the first plurality of training data points 302A. The first graphical representation 302C may include a plurality of nodes and a plurality of edges between the plurality of nodes. Each node of the plurality of nodes may represent a training data point of the first plurality of training data points 302A. Each edge of the plurality of edges may represent an impact score (or a weightage value) of the third plurality of impact scores for each training data point. The impact score may indicate the third amount of contribution of each of the first plurality of training data points 302A of the first neural network model 302B towards a prediction of the corresponding training data point. As shown in FIG. 3, the first graphical representation 302C may include a first node for a training data point "T1", a second node for a training data point "T2", a third node for a training data point "T3", a fourth node for a training data point "T4", . . . and an Nth node as a training data point "Tn". The plurality of edges may indicate an impact score W1, an impact score W2, an impact score W3, an impact score W4, . . . and an impact score Wn, as the third plurality of impact scores. In one or more embodiments, the third plurality of impact scores, such as, the impact score W1, the impact score W2, the impact score W3, the impact score W4, . . . and the impact score Wn, may be any value between "0" and "1". The generation of the first graphical representation 302C by the circuitry 202 may enable a determination of an impact of a first training data point of the first plurality of training data points 302A on a second training data point of the first plurality of training data points 302A, and vice versa.

In an embodiment, each edge between the first training data point and the second training data point, associated with the first graphical representation 302C, may have an associated width that may be indicative of an impact score for the first training data point towards the prediction of the second training data point. For example, the width of an edge may be thicker to represent a higher impact score and thinner to represent a lower impact score. In another embodiment, each edge of the first graphical representation 302C may have an associated color that may be indicative of an impact score of the first training data points for the second training data point. For example, a darker color (such as, black, brown, or red) of an edge may represent a higher impact score and a lighter color (such as, light blue, pale yellow, or cyan) of an edge may represent a lower impact score.

An exemplary relation between each training data point of the first plurality of training data points 302A based on the third plurality of impact scores may be indicated by a matrix of the third plurality of impact scores, as depicted in Table 1:

TABLE 1

The third plurality of impact scores for each training data point of the first plurality of training data points 302A

|  | T1 | T2 | T3 | T4 | Tn |
|---|---|---|---|---|---|
| T1 | 0.5 | 0.1 | 0.3 | 0.34 | 0.11 |
| T2 | 0.43 | 0.6 | 0.4 | 0.22 | 0.12 |
| T3 | 0.12 | 0.3 | 0.8 | 0.32 | 0.26 |
| T4 | 0.23 | 0.32 | 0.01 | 0.4 | 0.28 |
| Tn | 0.02 | 0.12 | 0.28 | 0.22 | 0.3 |

In accordance with an embodiment, the circuitry 202 may apply the first neural network model 302B to the training data point "T1" to generate the third plurality of impact scores for the training data point "T1". For example, with reference to Table 1, an impact score of the training data point "T1" towards itself (such as the training data point "T1") may be "0.5", an impact score of the training data point "T2" towards the training data point "T1" may be "0.43", and an impact score of the training data point "T3" towards the training data point "T1" may be "0.12". Further, an impact score of the training data point "T4" towards the training data point "T1" may be "0.23", and an impact score of the training data point "Tn" towards the training data point "T1" may be "0.02". Therefore, the third plurality of impact scores for the training data point "T1" are "0.5, 0.43, 0.12, 0.23, and 0.02" as per Table 1. Similarly, the impact scores for each training data point of the first plurality of training data points 302A may be determined. As shown in the Table 1, the impact score of a training data point towards itself may be maximum. It should be noted that data provided in Table 1 may merely be taken as experimental data and may not be construed to limit the present disclosure.

Though FIG. 3 is described for the first graphical representation 302C as a relation between each training data point of the first plurality of training data points 302A, the scope of the disclosure may not be so limited. In some embodiments, alternatively or in addition to the first graphical representation 302C, the circuitry 202 may be configured to generate a second graphical representation (not shown in FIG. 3) as a relation between each external data point and the first plurality of training data points 106, as described further for example, in FIG. 4.

In accordance with an embodiment, the circuitry 202 is further configured to apply a mathematical function to the determined third plurality of impact scores for each of the first plurality of training data points 302A. The mathematical function may include, but is not limited to, one of: a maxima function, an average function, a mean function, or a summation function. For example, based on the application of the average function, the circuitry 202 may determine an impact score (i.e. one score) for each of the first plurality of training data points 302A. In an exemplary embodiment, the circuitry 202 may apply the average function (as the mathematical function) on the impact scores (i.e. "0.5, 0.43, 0.12, 0.23, and 0.02") to determine the impact score "0.26" (i.e. average of "0.5, 0.43, 0.12, 0.23, and 0.02") for the training data point "T1". Similarly, the circuitry 202 may determine the impact score for each training data point ("T1", "T2", "T3", "T4", and Tn") based on the application of the mathematical function on the third plurality of impact scores determined for each training data point as per Table 1). In another example, in case of the application of the maxima function on the third plurality of impact scores, the impact score for the training data point "T1" is "0.5".

In accordance with an embodiment, the circuitry 202 may be configured to generate a prediction score for each of the first plurality of training data points 302A. The prediction score may indicate a confidence level of the first neural network model 302B in the prediction or classification of an output class label (such as a dog class label) for each of the first plurality of training data points 302A. In some embodiments, the circuitry 202 may be configured to apply the first neural network model 302B on each of the first plurality of training data points 302A to generate the prediction score for each of the first plurality of training data points 302A. In an example, the first neural network model 302B may predict the training data point "T1" accurately as an image of the dog, and the prediction score for the training data point "T1" may be determined as "0.9". In another example, the first neural network model 302B may predict another training data point of the first plurality of training data points 302A inaccurately as an image of the dog, and the prediction score for the training data point may be determined as "0.2".

At 304, a set of training data points may be selected. In accordance with an embodiment, the circuitry 202 may be configured to select the set of training data points from the first plurality of training data points 302A based on the determined third plurality of impact scores for each of the first plurality of training data points 302A. The set of training data points may be a subset of the first plurality of training data points 302A. In some embodiments, the circuitry 202 may be configured to select the set of training data points from the first plurality of training data points 302A based on the determined third plurality of impact scores and the generated prediction score for each of the first plurality of training data points 302A.

The selection of the set of training data points from the first plurality of training data points 302A may be based on a predefined selection criteria304A. In accordance with an embodiment, the circuitry 202 may select the set of training data points based on the predefined selection criteria 304A. In some embodiments, the circuitry 202 may be configured to select the set of training data points from the first plurality of training data points 302A based on a first range of impact scores. In such a scenario, the first range of impact scores may be the predefined selection criteria 304A. Thus, the set of training data points may include training data points that may have an impact score that may lie within the first range of impact scores. In an embodiment, the first range of impact scores may be between "0.1" and "0.5". In such a case, the training data point "T4" and the training data point "Tn" may be selected in the set of training data points, as the impact score of the training data point "T4" and the training data point "Tn" may be "0.4" and "0.3" respectively, based on the application of the maxima function (which lies in the first range of impact scores). Similarly, other training data points in the first plurality of training data points 302A, whose impact score may lie in the first range of impact scores may be selected in the set of training data points.

In some embodiments, the circuitry 202 may be configured to select the set of training data points from the first plurality of training data points 302A based on the predefined selection criteria 304A, such as, a second impact score threshold. The circuitry 202 may select the set of training data points such that each training data point in the selected set of training data points may have the impact score less than the second impact score threshold. For example, the second impact score threshold may be "0.25". The circuitry 202 may select the set of training data points of the first plurality of training data points 302A as training data points with the impact scores (for example average) less than the second impact score threshold of "0.25". In such a scenario, with reference to Table 1, the circuitry 202 may select the training data point Tn, as the impact score (i.e. average score) for the training data point "Tn" may be "0.21" (i.e. less than "0.25" as the second impact score threshold). Similarly, based on the application of different predefined mathematical function and the second impact score threshold, different training data points of the first plurality of training data points 302A may be selected in the set of training data points.

In some embodiments, the predefined selection criteria 304A for the selection of the set of training data points from the first plurality of training data points 302A may be, for example, "n" number of highest positive impact scores (such as Top-N), or "n" number of highest negative impact scores (such as Least-N) and so forth. For example, the impact scores determined for the first plurality of training data points 302A may be ordered (such an increasing or decreasing order), to select the set of training data points based on the predefined selection criteria 304A (such as Top-N or Least N). For example, as per Table 1, the training data point "T4" and the training data point "Tn" may be selected as the set of training data points based on the predefined selection criteria 304A, such as Least-2. In an embodiment, the predefined selection criteria 304A for the selection of the set of training data points may include a combination of the impact score and the prediction score for each of the first plurality of training data points 302A. For example, the predefined selection criteria 304A may include different scores thresholds (such as the second impact score threshold and a prediction threshold) to select the set of training data points from the first plurality of training data points 302A.

In accordance with an embodiment, the circuitry 202 may be configured to generate a first matrix representation 312 to depict the first plurality of training data points 302A based on the impact score (i.e. "IS") and the prediction score ("PS") as shown in FIG. 3. The impact score may be represented on an X-axis of the first matrix representation 312, whereas the prediction score may be represented on a Y-axis of the first matrix representation 312. The first matrix representation 312 may include a first quadrant 312A, a second quadrant 312B, a third quadrant 312C and a fourth quadrant 312D. In an exemplary embodiment, the training data points of the first plurality of training data points 302A that may have the prediction scores between a range of "0.5" and "1.0" may be classified as the training data points with a high prediction score. Further, the training data points of the first plurality of training data points 302A that may have the prediction scores between a range of "0" and "0.5" may be classified as the training data points with a low prediction score. Similarly, the training data points of the first plurality of training data points 302A that may have the impact score between a range of "0.5" and "1" may be classified as the training data points with a high impact score. Further, the training data points that may have the prediction scores between a range of "0" and "0.5" may be classified as the training data points with a low impact score, as shown in the first matrix representation 312 in FIG. 3.

The training data points of the first plurality of training data points 302A that lie in the first quadrant 312A may have the high prediction score and the high impact score. The training data points of the first plurality of training data points 302A that lie in the second quadrant 312B may have the high prediction score and the low impact score. The training data points of the first plurality of training data points 302A that lie in the third quadrant 312C may have the low prediction score and the low impact score. The training data points of the first plurality of training data points 302A that lie in the fourth quadrant 312D may have the low prediction score and the high impact score, as shown in the first matrix representation 312 in FIG. 3. In accordance with an embodiment, the circuitry 202 may select the training data points (i.e. from the first plurality of training data points 302A) that may lie in the first quadrant 312A and the fourth quadrant 312D, as the set of training data points.

In accordance with an embodiment, the circuitry 202 may be configured to select a particular predefined selection criteria 304A (such as impact range based, impact threshold based, order based, prediction based, or combination) based on different factors, such as, but not limited to, the real-time application, a type of the first plurality of training data points 302A, or a type of the first neural network model 302B.

At 306, the selected set of training data points may be removed. In accordance with an embodiment, the circuitry 202 may be configured to remove the selected set of training data points from the first plurality of training data points 302A. The removal of the selected set of training data points (i.e. with lower impact scores) from the first plurality of training data points 302A may ensure that unwanted training data points may be cleansed from the first plurality of training data points 302A. The removal of such unwanted training data points may improve the performance of the first neural network model 302B, based on re-training of the first neural network model 302B on remaining of the first plurality of training data points 302A. This may be because the removed set of training data points may have a lesser impact on a prediction output of the first neural network model 302B and may instead lead to introduction of an overfitting or bias error in the prediction output of the first neural network model 302B. In certain scenarios, the removal of unstructured or unwanted training data points may be performed, at a pre-analysis phase (such as training phase) or before the first neural network model 302B may be used in a production phase for prediction or the classification task.

At 308, the first plurality of training data points 302A may be updated. In accordance with an embodiment, the circuitry 202 may be configured to update the first plurality of training data points 302A. To update the first plurality of training data points 302A, the circuitry 202 may remove the selected set of training data points (for example the training data point "T4" and the training data point "Tn" described at 304) from the first plurality of training data points 302A to generate a fourth plurality of training data points. The fourth plurality of training data points may include the training data points of the first plurality of training data points 302A for which the impact scores (for example average score) is more than the second impact score threshold or which meet the predefined selection criteria 304A.

At 310, the first neural network model 302B may be re-trained with the generated fourth plurality of training data points. In accordance with an embodiment, the circuitry 202 may be configured to re-train the first neural network model 302B with the generated fourth plurality of training data points. To re-train the first neural network model 302B, the circuitry 202 may be configured to update one or more parameters of each node of the first neural network model 302B based on whether an output of the final layer for a given input (from the fourth plurality of training data points) matches a correct result based on a loss function for the first neural network model 302B. The above process may be repeated for the same or different inputs (or for certain epochs) till a minima of loss function may be achieved and a training error may be minimized. Several methods for re-training the first neural network model 302B are known in art, for example, gradient descent, stochastic gradient descent, batch gradient descent, gradient boost, meta-heuristics, and the like.

The re-training of the first neural network model 302B based on the fourth plurality of training data points may improve an existing performance of the first neural network model 302B. This may be because the fourth plurality of training data points may include the remaining of the first plurality of training data points after the removal of unwanted training data points. As the removed unwanted training data points may be less impactful (i.e. based on lower impact scores) for prediction of the output of the first neural network model 302B, the removal of such unwanted data points may reduce the overfitting or bias error in the prediction output of the first neural network model 302B after the re-training.

Although the diagram 300 is illustrated as discrete operations, such as 302, 304, 306, 308, and 310, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 4:
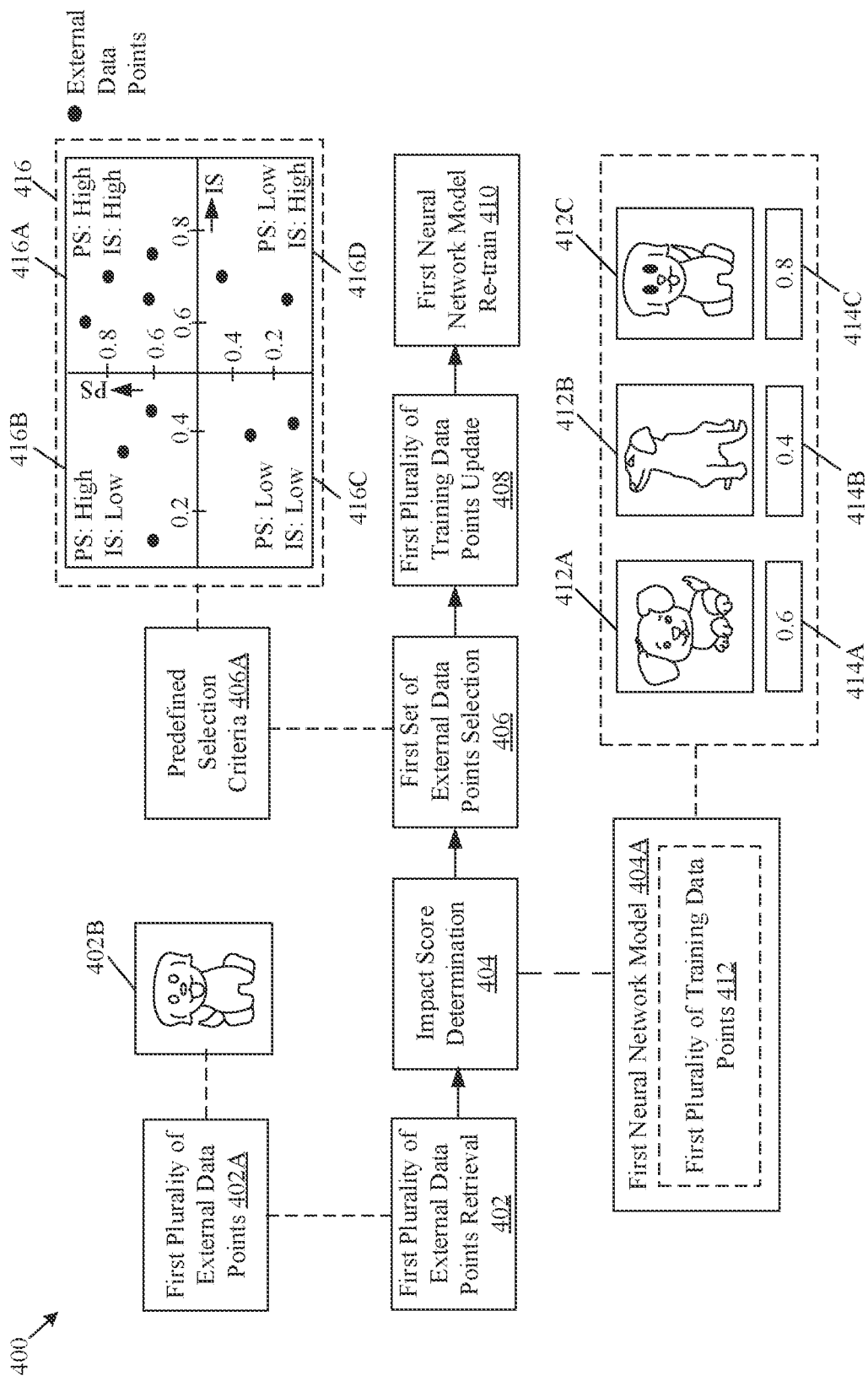
FIG. 4 is a diagram that illustrates exemplary operations for re-training the first neural network model of FIG. 1 based on selection of external data points, in accordance with an embodiment of the disclosure.

FIG. 4 is a diagram that illustrates exemplary operations for re-training the first neural network model of FIG. 1 based on selection of external data points, in accordance with an embodiment of the disclosure. FIG. 4 is explained in conjunction with elements from FIGS. 1,2 and 3. With reference to FIG. 4, there is shown a diagram 400 to depict exemplary operations from 402 to 410. The exemplary operations illustrated in the diagram 400 may start at 402 and may be performed by any computing system, apparatus, or device, such as, by the electronic device 102 of FIG. 1 or the circuitry 202 of FIG. 2.

At 402, a first plurality of external data points 402A may be retrieved. In accordance with an embodiment, the circuitry 202 may be configured to retrieve the first plurality of external data points 402A from the database 108. The first plurality of external data points 402A may be different from a first plurality of training data points 412 on which a first neural network model 404A (i.e. similar to the first neural network model 104 in FIG. 1 or the first neural network model 302B in FIG. 3) may be already trained. In some embodiments, the first neural network model 404A may be trained on the fourth plurality of training data points, as described in FIG. 3 (at 310). In such case, the trained first neural network model 404A may be already cleansed neural network model from which the unwanted training data points (for example with low impact score) is already removed as described in FIG. 3.

In an example, a first external data point 402B of the first plurality of external data points 402A is the image data. For example, the first external data point 402B corresponds to an image of a first dog. The circuitry 202 of the electronic device 102 may be configured to retrieve the first plurality of external data points 402A that may include the first external data point 402B. The first neural network model 404A may be trained on the first plurality of training data points 412 (such as a first training data point 412A, a second training data point 412B, and a third training data point 412C) which may be, for example, different images (i.e. images of dog as shown in FIG. 4). It may be noted that one first external data point 402B shown in FIG. 4 is merely an example. The first plurality of external data points 402A may include more than one external data points, without a deviation from scope of the disclosure.

At 404, a first plurality of impact scores for each of the first plurality of external data points 402A may be determined. In accordance with an embodiment, the circuitry 202 may be configured to determine the first plurality of impact scores for each of the first plurality of external data points 402A by an application of the first neural network model 404A on each of the first plurality of external data points 402A. The first plurality of impact scores may indicate a first amount of contribution of each of the first plurality of training data points 412, (such as the first training data point 412A, the second training data point 412B, and the third training data point 412C) of the first neural network model 404A towards prediction of each of the first plurality of external data points 402A. In an exemplary embodiment, an impact score for the first external data point 402B may indicate the first amount of contribution of each of the first plurality of training data points 412 towards prediction of the first external data point 402B, to determine the first plurality of impact scores for the first external data point 402B. In an example, for three training data points (as shown in FIG. 4), the electronic device 102 may determine three impact scores for the first external data point 402B.

In accordance with an embodiment, the impact score may indicate an influence of each of the first plurality of training data points 412 on the prediction or classification of the first external data point 402B. In an embodiment, the first amount of contribution (i.e. impact score) may indicate a number of features of each of the first plurality of training data points 412 that may have contributed (or used by the first neural network model 404A) towards the correct prediction of each of the first plurality of external data points, for example the first external data point 402B. The circuitry 202 may determine the impact score for the first external data point 402B by comparison of the number of features in the first external data point 402B and the number of features in each of the first plurality of training data points 412. In accordance with an embodiment, the first training data point 412A corresponds to an image of a second dog. The circuitry 202 may compare features of the first dog in the first external data point 402B with corresponding features of the second dog in the first training data point 412A. For example, the image of the first dog in the first external data point 402B may depict that the first dog may have features, such as, a large face, big ears, wide eyes, a small tail, a round nose, and a small built. Further, the image of the first dog may be a front profile of the first dog. Moreover, the image of the second dog in the first training data point 412A may indicate that the second dog may have features, such as, a medium-sized face, big ears, small eyes, a fluffy medium tail, a round nose, and a small built. Furthermore, the image of the second dog may be of a front profile of the second dog. The circuitry 202 may compare the features of the first dog and the features of the second dog and determine that the features, such as "the big ears, the round nose, the small built, and the front profile" may be common features (i.e. four features) in the first external data point 402B and the first training data point 412A. In an example, the circuitry 202 may determine an impact score 414A for the first external data point 402B as "0.6" with respect to the amount of the contribution or influence of the first training data point 412A towards the prediction or classification of the first external data point 402B as a dog image. In other words, as more number of features of the first training data point 412A matches with the features of the first external data point 402B, the first neural network model 404A (i.e. controlled by the circuitry 202) may predict or classify the first external data point 402B as the image of the dog.

Similarly, the circuitry 202 may further compare the features of the first dog in the first external data point 402B with corresponding features of a third dog in the second training data point 412B. The image of the third dog in the second training data point 412B may indicate that the third dog may have a small face, small ears, small eyes, a small tail, the round nose and a large built. Furthermore, the image of the third dog may be a side profile of a face of the third dog, as shown in FIG. 4. The circuitry 202 may compare the features of the first dog and the features of the third dog and determine that the features, such as, "the small tail and the round nose" may be the common features (i.e. two features) in the first external data point 402B and the second training data point 412B. In an example, the circuitry 202 may determine an impact score 4148 for the first external data point 402B as "0.4" (with respect to the amount of contribution of the second training data point 412B), which may be less than the impact score 414A as the number of common features between the first external data point 402B and the first training data point 412A may be more than the number of common features between the first external data point 402B and the second training data point 412B.

The circuitry 202 may further compare the features of the first dog in the first external data point 402B with corresponding features of a fourth dog in the third training data point 412C. The image of the fourth dog in the third training data point 412C may indicate that the fourth dog may have a large face, small ears, wide eyes, a small tail, a triangular nose, and a small built. Furthermore, the image of the fourth dog may be of a front profile of the fourth dog. The circuitry 202 may compare the features of the first dog and the features of the fourth dog, and determine that the features, such as, "the large face, the small ears, the wide eyes, the small tail (at a different position than a tail of the first dog), the small built, and the front profile" may be the common features (i.e. five features) in the first external data point 402B and the third training data point 412C. In an example, the circuitry 202 may determine an impact score 414C for the first external data point 402B as "0.8" (with respect to the amount of contribution of the third training data point 412C), which may be more than the impact score 414A and the impact score 414B. This may be because the number of common features (i.e. five) between the first external data point 402B and the third training data point 412C may be more than the number of common features (i.e. four) between the first external data point 402B and the first training data point 412A, and the number of common features (i.e. two) between the first external data point 402B and the second training data point 412B. Thus, the determined first plurality of impact scores by the circuitry 202 may include the impact score 414A, the impact score 414B, and the impact score 414C, for the first external data point 402B.

In accordance with an embodiment, the circuitry 202 is further configured to apply the mathematical function to the determined first plurality of impact scores of the first external data point 402B. The application of the mathematical function to the determined first plurality of impact scores may be similar to the application of the mathematical function to the determined third plurality of impact scores, as described for example, in FIG. 3. The circuitry 202 may determine a first impact score (i.e. one impact score) for the first external data point 402B based on the application of the mathematical function to the determined first plurality of impact scores of the first external data point 402B. In an exemplary embodiment, the circuitry 202 may apply the average function as the mathematical function on the impact score 414A, the impact score 414B and the impact score 414C to determine the first impact score for the first external data point 402B. In such a case, the circuitry 202 may apply the average function on the first plurality of impact scores "0.6, 0.4, and 0.8" to determine the first impact score as "0.6" for the first external data point 402B. Similarly, the circuitry 202 may determine the first impact score for each of the first plurality of external data points 402A. In another example, in case of the application of the maxima function on the plurality of impact scores, the first impact score for the first external data point 402B is "0.8".

In accordance with an embodiment, the circuitry 202 may be configured to generate the prediction score for each of the first plurality of external data points 402A. In some embodiments, the circuitry 202 may be configured to apply the first neural network model 404A on each of the first plurality of external data points 402A to generate the prediction score for each of the first plurality of external data points 402A. In an example, the first neural network model 404A may predict the first external data point 402B accurately as an image of the dog, and the prediction score for the first external data point 402B may be determined as "0.9". In another example, the first neural network model 404A may predict another external data point of the first plurality of external data points 402A inaccurately as an image of the dog, and the prediction score for the external data point may be determined as "0.1".

At 406, the first set of external data points may be selected. In accordance with an embodiment, the circuitry 202 may be configured to select the first set of data points from the first plurality of external data points 402A, based on the determination of the first plurality of impact scores for each of the first plurality of external data points 402A. In some embodiments, the circuitry 202 may be configured to select the first set of external data points from the first plurality of external data points 402A based on the determined first impact score and the generated prediction score for each of the first plurality of external data points 402A.

In accordance with an embodiment, the circuitry 202 may select the first set of external data points based on the predefined selection criteria 406A (shown in FIG. 4). In some embodiments, the circuitry 202 may be configured to select the first set of external data points from the first plurality of external data points 402A based on a first range of impact scores. In such a scenario, the first range of impact scores may be the predefined selection criteria 406A. Thus, the first set of external data points may include external data points that may have an impact score that may lie within the first range of impact scores. In an embodiment, the first range of impact scores may be between "0.5" and "1.0". In such a case, the first external data point 402B may be selected in the first set of external data points, as the first impact score of the first external data point 402B may be "0.6" (which lies in the first range of impact scores). Similarly, other external data points in the first plurality of external data points 402A, whose first impact score may lie in the first range of impact scores may be selected in the first set of external data points.

In accordance with another embodiment, the circuitry 202 may be configured to select the first set of external data points from the first plurality of external data points 402A based on a first impact score threshold. In such a scenario, the first impact score threshold may be the predefined selection criteria 406A. Thus, each external data point in the first plurality of external data points 402A that may have an impact score above the first impact score threshold, may be selected in the first set of external data points. In an embodiment, the first impact score threshold may be for example, "0.5". In such a case, the first external data point 402B may be selected in the first set of external data points, as the first impact score for the first external data point 402B is "0.6" (which lies above the first impact score threshold). The determination of the first impact score for the first external data point 402B based on the average function is described, for example, at 404 in FIG. 4. Similarly, other external data points in the first plurality of external data points 402A, whose first impact score may lie above the first impact score threshold may be selected in the first set of external data points.

In some embodiments, the predefined selection criteria 406A for the selection of the first set of external data points from the first plurality of external data points 402A may be, for example, "n" number of highest positive impact scores (such as Top-N), or "n" number of highest negative impact scores (such as Least-N) and so forth. For example, the first impact scores determined for the first plurality of external data points 402A may be ordered (such an increasing or decreasing order), to select the first set of external data points based on the predefined selection criteria 406A (such as Top-N or Least N). For example, first two external data points in the ordered first plurality of external data points 402A may be selected as the first set of external data points based on the predefined selection criteria 304A, such as Top-2. In an embodiment, the predefined selection criteria 406A for the selection of the first set of external data points may include a combination of the first impact score and the prediction score for each of the first plurality of external data points 402A. For example, the predefined selection criteria 406A may include different scores thresholds (such as the first impact score threshold and a prediction threshold) to select the first set of external data points from the first plurality of external data points 402A.

In accordance with an embodiment, the circuitry 202 may be configured to generate a second matrix representation 416 to depict the first plurality of external data points 402A based on the first impact score (i.e. "IS") and the prediction score ("PS") as shown in FIG. 4. The first impact score may be represented on an X-axis of the second matrix representation 416, whereas the prediction score may be represented on a Y-axis of the second matrix representation 416. The second matrix representation 416 may include a first quadrant 416A, a second quadrant 4168, a third quadrant 416C and a fourth quadrant 416D. In an exemplary embodiment, the external data points of the first plurality of external data points 402A that may have the prediction scores between a range of "0.5" and "1.0" may be classified as the external data points with a high prediction score. Further, the external data points of the first plurality of external data points 402A that may have the prediction scores between a range of "0" and "0.5" may be classified as the external data points with a low prediction score. Similarly, the external data points of the first plurality of external data points 402A that may have the first impact score between a range of "0.5" and "1" may be classified as the external data points with a high first impact score. Further, the external data points that may have the prediction scores between a range of "0" and "0.5" may be classified as the external data points with a low first impact score, as shown in the second matrix representation 416 in FIG. 4.

The external data points of the first plurality of external data points 402A that lie in the first quadrant 416A may have the high prediction score and the high first impact score. The external data points of the first plurality of external data points 402A that lie in the second quadrant 416B may have the high prediction score and the low first impact score. The external data points of the first plurality of external data points 402A that lie in the third quadrant 416C may have the low prediction score and the low first impact score. The external data points of the first plurality of external data points 402A that lie in the fourth quadrant 416D may have the low prediction score and the high first impact score, as shown in the second matrix representation 416 in FIG. 4. In accordance with an embodiment, the circuitry 202 may select the external data points (i.e. from the first plurality of external data points 402A) that may lie in the first quadrant 416A and the fourth quadrant 416D, as the first set of external data points.

In accordance with an embodiment, the circuitry 202 may be configured to select a particular predefined selection criteria 406A (such as impact range based, impact threshold based, order based, prediction based, or combination) based on different factors, such as, but not limited to, the real-time application, a type of the first plurality of external data points 402A, or a type of the first neural network model 404A.

At 408, the first plurality of training data points 412 may be updated. In accordance with an embodiment, the circuitry 202 may be configured to update the first plurality of training data points 412 with the selected first set of external data points to generate a second plurality of training data points (not shown in FIG. 4). The generated second plurality of training data points may include the first plurality of training data points 412 and the selected first set of external data points (i.e. selected at 406). Thus, the first plurality of training data points 412 may be updated to include the selected first set of external data points to generate the second plurality of training data points. The selected first set of external data points may be more impactful external data points (i.e. out of the first plurality of external data points 402A) for which the amount of contribution or influence of the first plurality of training data points 412 (i.e. on which the first neural network model 404A is already trained) is high. Therefore, inclusion of such selected first set of external data points (as more impactful external data points) in the first plurality of training data points 412 to generate the second plurality of training data points may further enhance the accuracy or prediction performance of the first neural network model 404A.

At 410, the first neural network model 404A may be re-trained with the generated second plurality of training data points. In accordance with an embodiment, the circuitry 202 may be configured to re-train the first neural network model 404A with the generated second plurality of training data points. The re-training of the first neural network model 404A based on the generated second plurality of training data points may be similar to the re-training of the first neural network model 302B described further, for example, in FIG. 3 (at 310).

Advantageously, the generated second plurality of training data points may be the appropriate training data points to re-train the first neural network model 404A. In accordance with an embodiment, the first neural network model 404A may be re-trained for a plurality of classes, such as for a class dog, a class cat, a class horse and so forth. In such a case, the circuitry 202 may enable efficient selection of appropriate external data points from a large external dataset (i.e. external data) of the plurality of classes. The first plurality of external data points 402A (which may be unknown to the first neural network model 404A) may thereby prioritized for the selection of the first set of external data points for the re-training by the disclosed electronic device 102, instead of usage of all external data points in the first plurality of external data points 402A for the re-training. Further, the first set of external data points may be more effective or impactful for the re-training of the first neural network model 404A, as such external data points may be selected based on the determined impact scores for each of the first plurality of external data points 402A, instead of random selection. Thus, the disclosed electronic device 102 may thereby enable efficient and faster re-training of the first neural network model 404A based on prioritization (or selection) of impactful external data points from the first plurality of external data points 402A, instead of usage of random external data points or all external data points of the first plurality of external data points 402A for the re-training.

In accordance with an embodiment, the circuitry 202 may be further configured to apply the re-trained first neural network model 404A on the selected first set of external data points (on which the first neural network model 404A is re-trained at 410), to generate a set of prediction scores for the validation of the prediction for the first set of external data points. The validation of the prediction for the first set of external data points by the generated set of prediction scores may further verify that the performance of the re-trained first neural network model 404A is better (or not) than the performance of the first neural network model 404A before re-training. In some embodiments, the circuitry 202 may be further configured to apply the re-trained first neural network model 404A on other external data points (different than the selected first set of external data points) to generate the set of prediction scores for the validation of the prediction for the first set of external data points.

The circuitry 202 may be configured to generate the second graphical representation. The second graphical representation may be similar to the first graphical representation but may be for each external data point in the first plurality of external data points 110, instead of each training data point in the first plurality of training data points 302A. For example, the second graphical representation may include a plurality of nodes and a plurality of edges between the plurality of nodes. Few nodes of the plurality of nodes in the second graphical representation may represent an external data point of the first plurality of external data points 110 and other nodes in the plurality of nodes may represent a training data point. Each edge of the plurality of edges in the second graphical representation may represent an impact score (or a weightage value) of a plurality of impact scores for each external data point. The impact score may indicate an amount of contribution of each of the first plurality of training data points 106 of the first neural network model 302B towards a prediction of the external data point of the first plurality of external data points 110 as described, for example in FIGS. 1 and 4.

The circuitry 202 may be configured to display the determined graphical relations (i.e., the first graphical representation 302C and/or the second graphical representation) through the I/O device 206. This may enable a user of the electronic device 102 to understand impactful external data points (as well as training data points) and also understand a feature extraction ability of the trained first neural network model 302B for the prioritization and selection or removal of data points (e.g., the first plurality of training data points 106 and/or the first plurality of external data points 110).

Although the diagram 400 is illustrated as discrete operations, such as 402, 404, 406, 408, and 410, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 5:
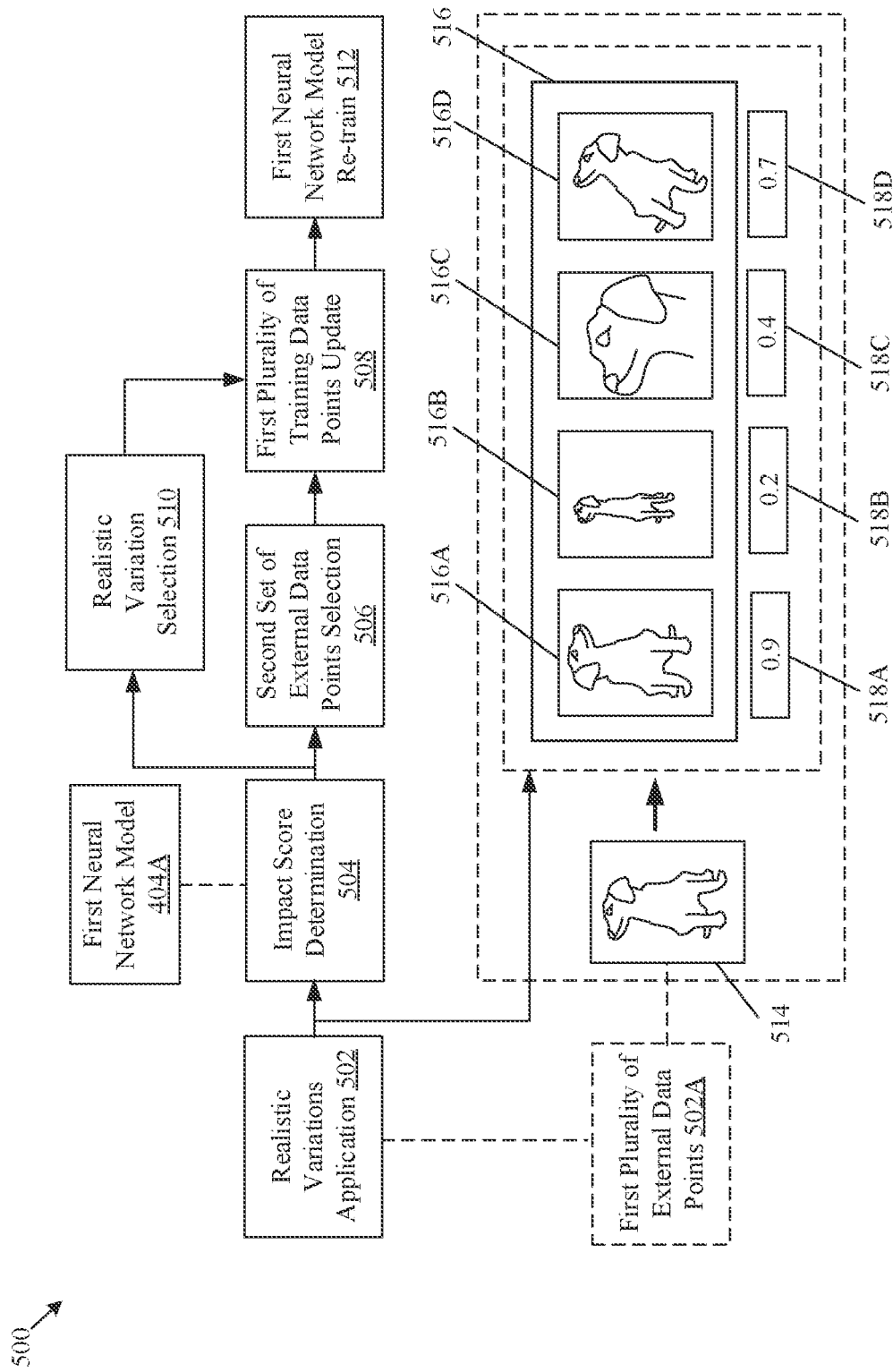
FIG. 5 is a diagram that illustrates exemplary operations for re-training the first neural network model based on selection of external data points with applied plurality of realistic variations, in accordance with an embodiment of the disclosure.

FIG. 5 is a diagram that illustrates exemplary operations for re-training the first neural network model based on selection of external data points with applied plurality of realistic variations, in accordance with an embodiment of the disclosure. FIG. 5 is explained in conjunction with elements from FIGS. 1, 2, 3, and 4. With reference to FIG. 5, there is shown a diagram 500 to depict exemplary operations from 502 to 512. The exemplary operations illustrated in the diagram 500 may start at 502 and may be performed by any computing system, apparatus, or device, such as by the electronic device 102 of FIG. 1 or the circuitry 202 of FIG. 2.

At 502, a plurality of realistic variations may be applied to one or more external data points of a first plurality of external data points 502A. In accordance with an embodiment, the circuitry 202 may be configured to apply the plurality of realistic variations to the one or more external data points, (for example, an external data point 514 of the first plurality of external data points 502A) to generate a second plurality of external data points, such as the second plurality of external data points 516. The one or more external data points, such as a first external data point 516A, a second external data point 516B, a third external data point 516C, and a fourth external data point 516D of the generated second plurality of external data points 516 may correspond to different realistic variation of the plurality of realistic variations applied on the external data point 514 of the first plurality of external data points 502A. It may be noted that the external data point 514 shown as a dog image in FIG. 5, is merely presented as an example. The external data point 514 may be any image data, audio data, text data, three-dimensional (3D) data, or electrical signals, without a deviation from the scope of the disclosure.

In accordance with an embodiment, the plurality of realistic variations may include, but is not limited to, a rotation variation, a horizontal translation variation, a vertical translation variation, a shear variation, a zoom variation, a brightness variation, a contrast variation, a flip variation, a sharpness variation, or a color variation. In an exemplary implementation, the first external data point 516A may be a flip variation of the external data point 514, and the second external data point 516B may be a zoom variation (e.g., a zoomed-out variation) of the external data point 514. Further, the third external data point 516C may be a zoom variation (e.g., a zoomed-in variation) of the external data point 514, and the fourth external data point 516D may be a rotation variation of the external data point 514. In an example, the one or more external data points may be the audio data. In such a case, the plurality of realistic variations may include, but not limited to, audio augmentation techniques, such as increase/decrease in volume of the audio data (i.e. volume variation), change in frequency of the audio data (i.e. frequency variation), change in sound equalization (i.e. audio equitization variation), tone variation, and/or addition of noise in the audio data (i.e. audio noise variation).

At 504, a second plurality of impact scores for each of the generated second plurality of external data points 516 may be determined. In accordance with an embodiment, the circuitry 202 may be configured to apply the first neural network model 404A on the generated second plurality of external data points 516 to determine the second plurality of impact scores for each of the generated second plurality of external data points 516. The second plurality of impact scores may indicate a second amount of contribution or influence of each of the first plurality of training data points 412 (shown in FIG. 4) of the first neural network model 404A towards a prediction of each of the generated second plurality of external data points 516. The determination of the second plurality of impact scores for the second plurality of external data points 516 is similar to the determination of the first plurality of impact scores for the first plurality of external data points 502A, as described, for example, in FIG. 4 at 404.

In an exemplary implementation, the circuitry 202 may determine an impact score 518A as "0.9" for the first external data point 516A based on the comparison of features of the external data point 514 with corresponding features of the first external data point 516A. As the first external data point 516A is a flip variation of the external data point 514, a majority of features may be common between the external data point 514 and the first external data point 516A. In other words, an amount of contribution or influence of at least one of the first plurality of training data points 412 (i.e. on which the first neural network model 404A is trained) towards the prediction of the first external data point 516A or the external data point 514 may high (i.e. as described, for example, in FIG. 4). Thus, the circuitry 202 may determine the impact score 518A, for example, as "0.9" for the first external data point 516A. As another example, the circuitry 202 may further determine an impact score 518B as "0.2" for the second external data point 516B based on the comparison of the features of the external data point 514 with corresponding features of the second external data point 516B. As the second external data point 516B is a zoomed-out variation of the external data point 514, there may be a few common features between the external data point 514 and the second external data point 516B or few common features between the second external data point 516B and at least one of the first plurality of training data points 412. Thus, the circuitry 202 may further determine an impact score 518B as "0.2" for the second external data point 516B. Similarly, the circuitry 202 may determine an impact score 518C as "0.4" for the third external data point 516C (i.e. a zoomed-in variation) and an impact score 518D as "0.7" for the fourth external data point 516D (i.e. rotation variation).

At 506, a second set of external data points may be selected from the generated second plurality of external data points 516. In accordance with an embodiment, the circuitry 202 may be configured to select the second set of external data points from the generated second plurality of external data points 516 based on the determined second plurality of impact scores for each of the generated second plurality of external data points 516. In some embodiments, the circuitry 202 may select the second set of external data points from the generated second plurality of external data points 516 based on a predefined selection criteria, such as, the predefined selection criteria described, for example, in FIGS. 3 and 4. In an example, the circuitry 202 may select the second set of external data points based on the predefined selection criteria, such as, based on a range of the impact scores. For example, the circuitry 202 may select external data points from the second plurality of external data points 516, whose impact score lie between the range of "0.5" and "1.0". Thus, the circuitry 202 may select the first external data point 516A with the impact score 518A and the fourth external data point 516D with the impact score 518D, as the second set of external data points from the generated second plurality of external data points 516. In such scenario, a first realistic variation (e.g., the flip variation), applied to the external data point 514 to generate the first external data point 516A, may be different from a second realistic variation (e.g., the rotation variation), applied to the external data point 514 to generate the fourth external data point 516D. However, the scope of the disclosure may not be limited to the fact that the external data points (such as the first external data point 516A and the fourth external data point 516D) selected in the second set of external data points, may have different realistic variations, such as the first realistic variation is different from the second realistic variation. In certain embodiments, the first realistic variation and the second realistic variation of different selected external data points may be same, without departure from the scope of the disclosure.

At 508, the first plurality of training data points, such as, the first plurality of training data points 412 may be updated. The circuitry 202 may be configured to update the first plurality of training data points 412 with the second set of external data points selected from the generated second plurality of external data points 516, to generate a third plurality of training data points. The third plurality of training data points may include the first plurality of training data points 412 and the selected second set of external data points. Thus, the circuitry 202 may select external data points, such as, the first external data point 516A and the fourth external data point 516D from the second plurality of external data points 516, as augmented external data points. The augmented external data points may be added to the first plurality of training data points 412 (i.e., an original training data points) to re-train the first neural network model 404A and enhance a performance of the first neural network model 404A. With reference to FIG. 3, the augmented external data points may be added to the fourth plurality of training data points (i.e., cleaned training data points) to re-train the first neural network model 404A and enhance a performance of the first neural network model 404A.

At 510, a realistic variation may be selected from the plurality of realistic variations applied to the one or more external data points of the first plurality of external data points 502A. In accordance with an embodiment, the circuitry 202 may be configured to analyze the realistic variations of the external data points in the selected second set of external data points, to determine the most common realistic variation in the selected second set of external data points (i.e. with higher impact scores). The circuitry 202 may select a realistic variation (as most common) from the plurality of realistic variations, for future application (as shown in FIG. 5) of the realistic variations on the first plurality of external data points 502A (i.e. described, for example, at 502), since the selected realistic variation may be a best variation with higher probability in the selection of external data points and to increase performance of the first neural network model 404A. Thus, the selected realistic variation may provide more impactful external data points on which the first neural network model 404A can be further re-trained to increase the accuracy of the prediction or classification task. For example, in case the flip variation provides a high impact score (i.e. which may satisfy the predefined selection criteria) to the one or more selected external data points of the first plurality of external data points 502A, the circuitry 202 may select the flip variation as the appropriate realistic variation. The circuitry 202 may apply such flip variation (as the selected realistic variation) to the one or more external data points of the first plurality of external data points 502A to generate the second plurality of external data points 516 in future. Thus, the circuitry 202 may thereby prioritize augmentation techniques (or realistic variations) and select an appropriate augmentation technique to apply on one or more of the first plurality of external data points 502A to generate the augmented data points based on impact scores determined for each augmentation technique with respect to the first neural network model 404A. In an embodiment, different realistic variations (or augmentation techniques) may be applied to different types of images in the one or more external data points based on impact scores associated with the variations on the images. For example, a flip variation may provide a high impact score for one or more first external data points (e.g., images of dogs), while a rotation variation may provide a high impact score for one or more second external data points (e.g., images of cats or other types of images or data points). In such case, the circuitry 202 may select the flip variation as the appropriate realistic variation for the one or more first external data points and select the rotation variation as the appropriate realistic variation for the one or more second external data points.

At 512, the first neural network model 404A may be re-trained with the generated third plurality of training data points. In accordance with an embodiment, the circuitry 202 may be configured to re-train the first neural network model 404A with the generated third plurality of training data points (i.e. generated at 508). The re-training of the first neural network model 404A based on the generated third plurality of training data points may be similar to the re-training of the first neural network model 404A described further, for example, in FIG. 3 (at 310) and FIG. 4 (at 410). The re-training of the first neural network model 404A based on the addition of the augmented external data points to the original training data points may make the first neural network model 404A robust to the variations in external data points, as this may lead to an increase in the diversity of a training data set for the re-training and further improves an accuracy of prediction output of the first neural network model 404A. Further, as the augmented external data points may include most impactful (based on high impact scores) realistic variations of external data points, the augmented external data points may be more useful for the re-training of the first neural network model 404A, instead of realistic variations of external data points selected randomly or based on trial and error.

Although the diagram 500 is illustrated as discrete operations, such as 502, 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 6:
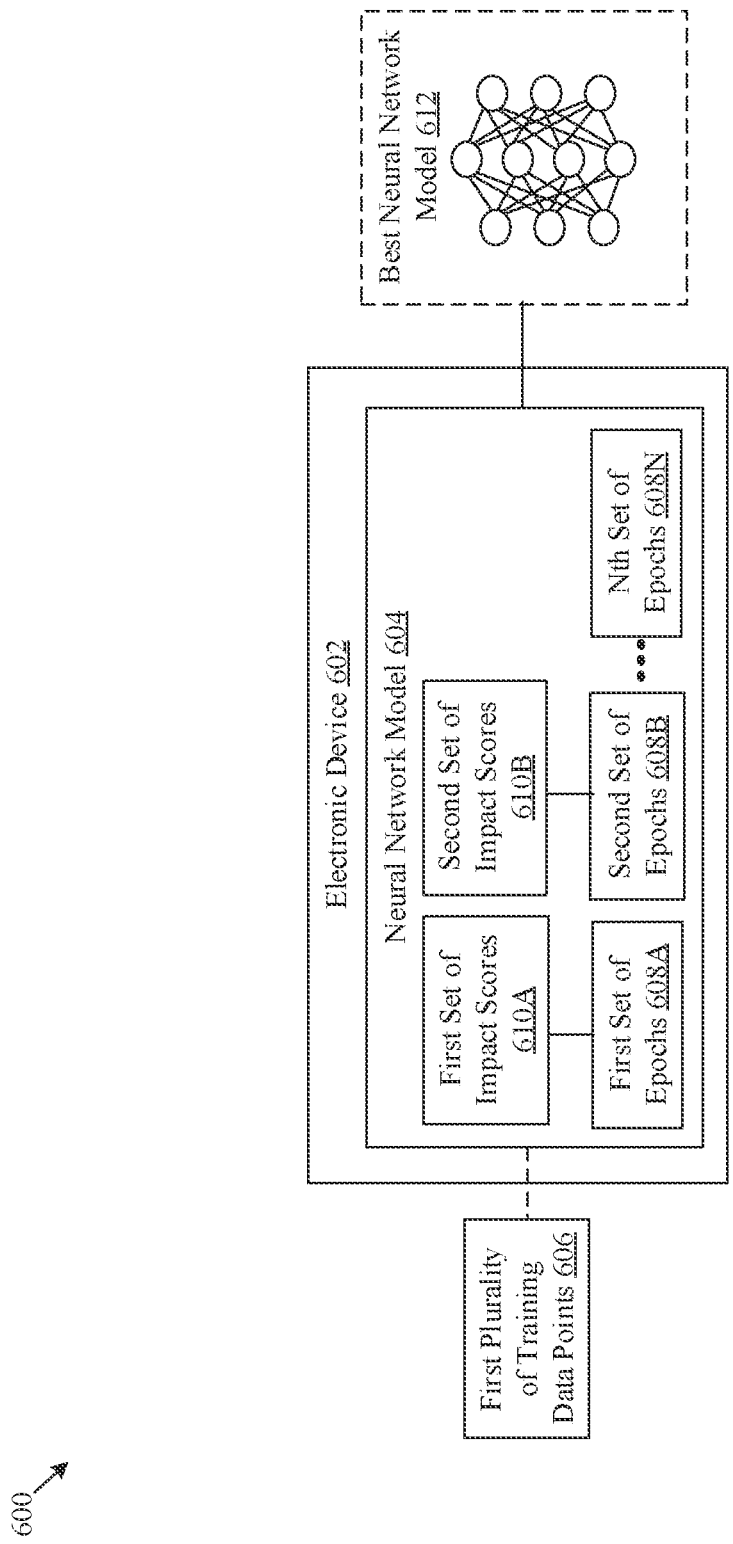
FIG. 6 is a block diagram that illustrates exemplary dynamic tracking of the first neural network model, in accordance with an embodiment of the disclosure.

FIG. 6 is a block diagram that illustrates exemplary dynamic tracking of the first neural network model, in accordance with an embodiment of the disclosure. FIG. 6 is explained in conjunction with elements from FIGS. 1, 2, 3, 4, and 5. With reference to FIG. 6, there is shown a block diagram 600. The block diagram 600 may include an electronic device 602. In one or more embodiments, the electronic device 602 may be similar to the electronic device 102. The electronic device 602 may include a first neural network model 604 (i.e. similar to the first neural network model 104 in FIG. 1). The block diagram 600 may further include a first plurality of training data points 606 on which the first neural network model 604 has to be trained or retrained. In such case the first plurality of training data points 606 may be similar to the second plurality of training data points (i.e. described at 408-410 in FIG. 4), or similar to the third plurality of training data points (i.e. described at 508 and 510 in FIG. 5), or similar to the fourth plurality of training data points (i.e. described at 308-310 in FIG. 3). In some embodiments, the first plurality of training data points 606 may be original training data points to train an untrained neural network model. The circuitry 202 may dynamically track the training of the first neural network model 604 for a plurality of epochs, such as a predefined number of epochs (for example 100 in number) for which first neural network model 604 has to be trained. The plurality of epochs may include first set of epochs 608A, a second set of epochs 608B, . . . and an Nth set of epochs 608N.

The circuitry 202 may be further configured to select the first neural network model 604 for training for the plurality of epochs based on the first plurality of training data points 606. The circuitry 202 may be further configured to control a set of operations for training the selected first neural network model 604. The set of operations may include control of the training of the first neural network model 604 for one of more epochs (such as the first set of epochs 608A of the plurality of epochs) to generate a second neural network model trained on the first plurality of training data points 606 for the first set of epochs 608A which may be a sub-set of the plurality of epochs. The circuitry 202 of the electronic device 602 may be configured to control the training of the first neural network model 604 for the first set of epochs 608A of the plurality of epochs to generate the second neural network model.

The circuitry 202 may be further configured to determine an impact score for each of the first plurality of training data points 606 during the training of the first neural network model 604 for the first set of epochs 608A. The impact score may indicate an amount of contribution (or impact/influence) of each of the first plurality of training data points 606 of the generated second neural network model towards prediction of each of the first plurality of training data points 606 (as described, for example, in FIG. 3 at 302). For the determination of the impact score, the circuitry 202 may determine a first set of impact scores 610A for the first plurality of training data points 606 based on the comparison of features in each of the first plurality of training data points 606 with corresponding features in each of other training data points of the first plurality of training data points 606. The determination of the impact scores (i.e. also referred as data selection plug-in) for the first plurality of training data points 606 during the training of the first neural network model 604 may be referred as dynamic tracking of the training of the first neural network model 604.

The circuitry 202 may be further configured to re-select the generated second neural network model as the first neural network model 604 for the training for others (i.e. remaining) of the plurality of epochs, based on a comparison between the first set of impact scores 610A and a training impact threshold. In an example, the training impact threshold may be a value between "0" and "1", such as, "0.55". In an exemplary embodiment, in case the first set of impact scores 610A (i.e. each score or average score) for the first plurality of training data points 606, after the training for the first set of epochs 608A, is less than the training impact threshold (e.g., 0.55), the circuitry 202 may be configured to re-select the generated second neural network model as the first neural network model 604 for further training (say for the second set of epochs 608B). In another exemplary embodiment, in case an average impact score of the first set of impact scores 610A after the training for the first set of epochs 608A is less than the training impact threshold, then the circuitry 202 may be configured to re-select the generated second neural network model as the first neural network model 604 for further training (say for the second set of epochs 608B). Alternatively, in case the first set of impact scores 610A (or the average score) is more than the training impact threshold (e.g., 0.55), the circuitry 202 may obtain the generated second neural network model as the trained second neural network model or a best neural network model 612 as shown in FIG. 6. In such case, the electronic device 602 may stop further training of the neural network model (say for the second set of epochs 608B and the Nth set of epochs 608N) and the generated second neural network model (i.e. intermediate model) may be obtained as a final or best neural network model 612.

In an embodiment, in case the first set of impact scores 610A for the first set of epochs 608A is less than the training impact threshold, the circuitry 202 may be configured to control the training of the generated second neural network model (as the re-selected the first neural network model 604) for the second set of epochs 608B of the plurality of epochs to generate a third neural network model. In other words, the circuitry 202 may control the second neural network model to continue training for the other sets of epochs of the plurality of epochs (such as the second set of epochs 608B and the and the Nth set of epochs 608N). Similarly, the circuitry 202 may be configured to re-select the generated third neural network model as the first neural network model 604, in case the second set of impact scores 610B during/after the training for the second set of epochs 608B is less than the training impact threshold. Alternatively, the circuitry 202 may be configured to obtain the generated third neural network model as the trained third neural network model or the best neural network model 612, in case the second set of impact scores 6108 (or the average score) is more than the training impact threshold. Thus, the circuitry 202 may be configured to obtain the best neural network model 612 based on an iterative control of the set of operations and dynamically track of the impact scores for the first plurality of training data points 606 after training the neural network model for one or more epochs (i.e. subset of the plurality of epochs). The electronic device 602 may thereby ensure that the best neural network model 612 may be selected based on the dynamic tracking of the training of the first neural network model 604. Thus, based on the dynamic determination of impact scores for training data points in each set of epochs, the first neural network model 604 may be effectively trained and the best neural network model 612 may be selected at intermediate training stage when the impact scores for a certain set of epochs become greater than the training impact threshold, rather than training the first neural network model 604 for the complete plurality of epochs (i.e. which may be large number of epochs). This may reduce the time and computational resources required for the training of the first neural network model 604, as the best neural network model 612 may be obtained faster and in a lesser number of epochs.

Figure 7A:
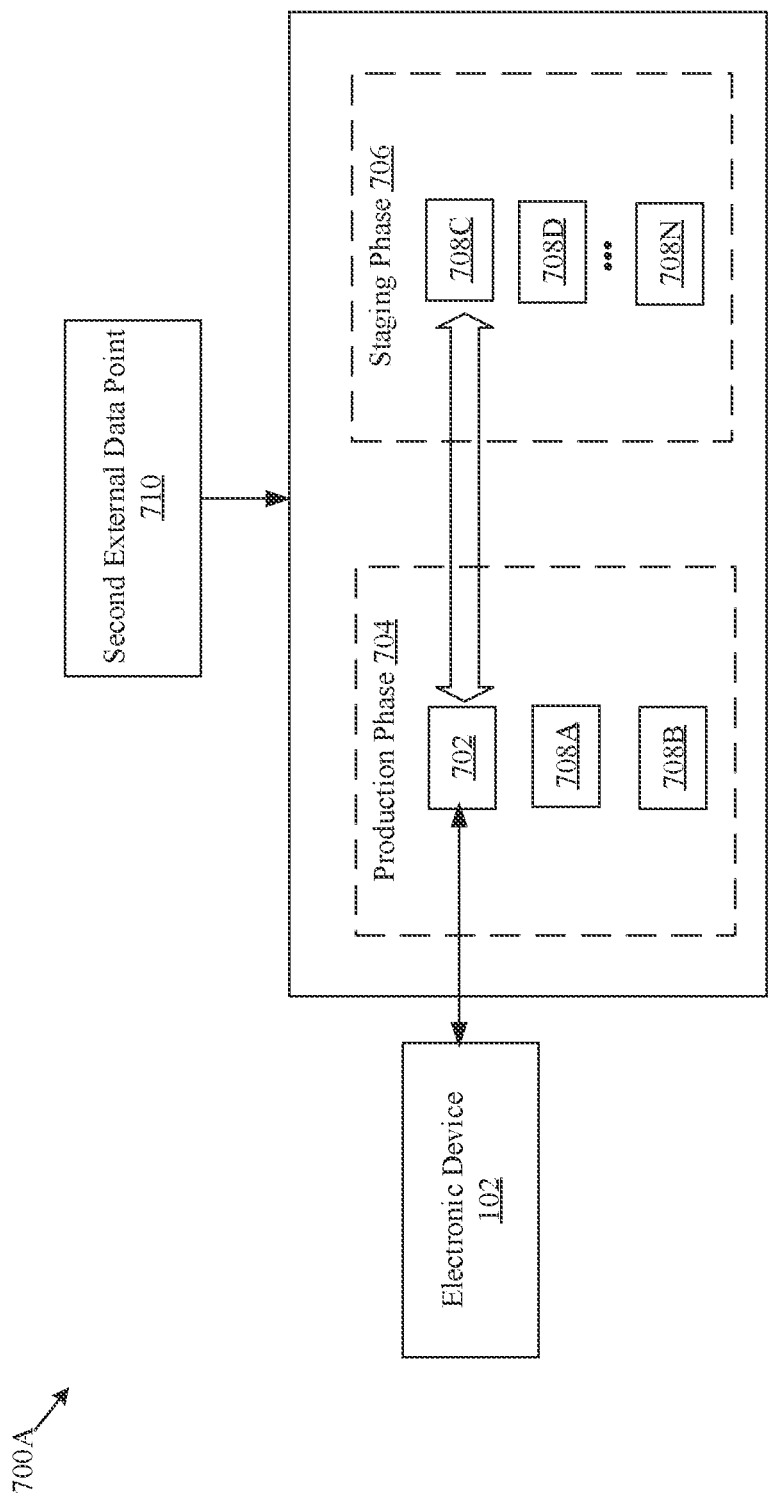
FIGS. 7A-7B are block diagrams that illustrates exemplary operations of the electronic device to control a first neural network model and a plurality of second neural network models, in accordance with an embodiment of the disclosure.
Figure 7B:
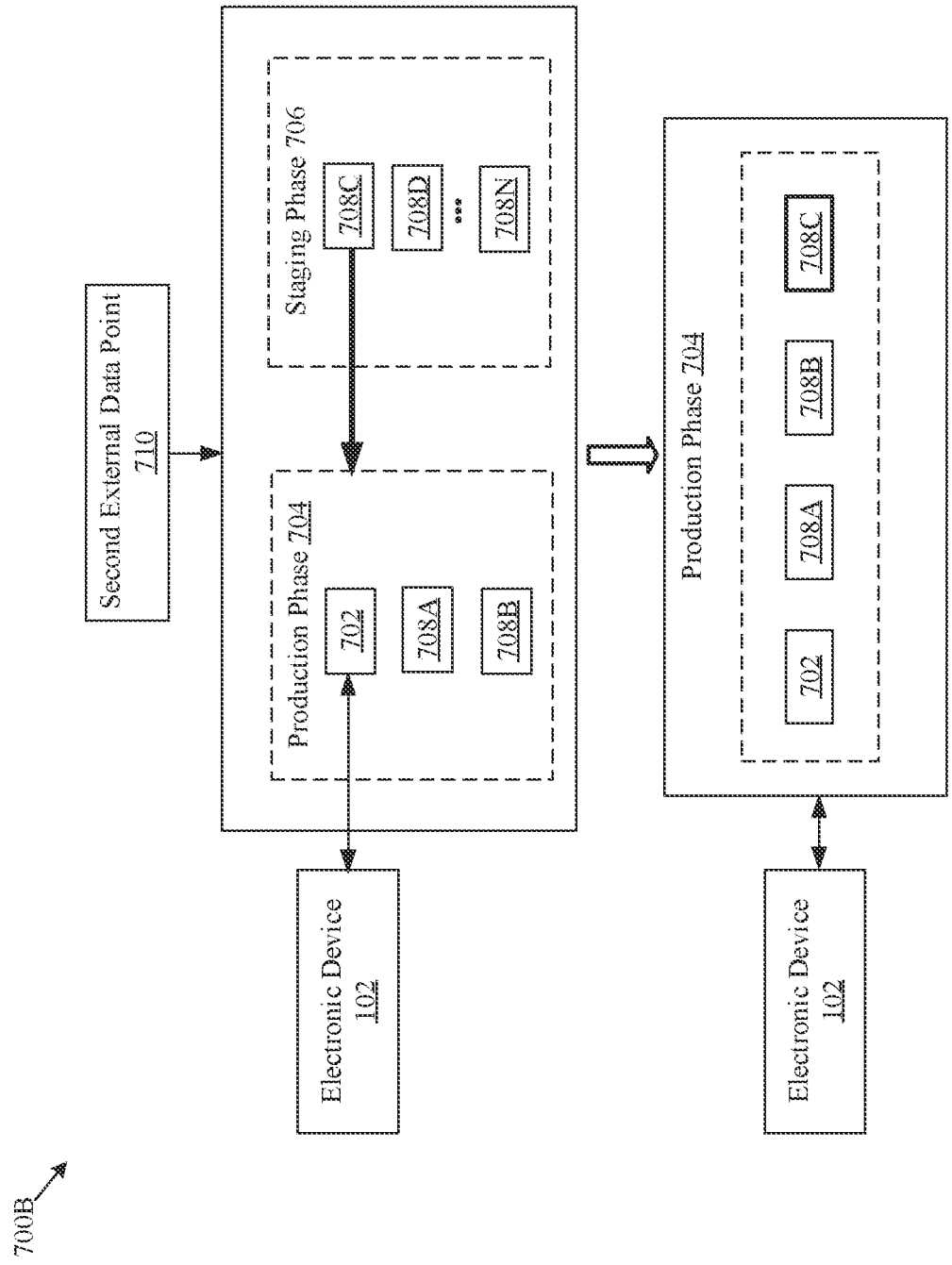

FIGS. 7A-7B are block diagrams that illustrates exemplary operations of the electronic device to control a first neural network model and a plurality of second neural network models, in accordance with an embodiment of the disclosure. FIGS. 7A-7B are explained in conjunction with elements from FIGS. 1, 2, 3, 4, 5, and 6. With reference to FIG. 7A, there is shown a block diagram 700A. The block diagram 700A may include the electronic device 102 and a first neural network model 702 in a production phase 704 of a particular application (for example real-time application described in FIG. 3). The production phase 704 may correspond to a phase in a real-time production environment, where the trained neural network models (such as the first neural network model 702) may be deployed to perform prediction (such as the classification task) for the real-time application. There is further shown a plurality of second neural network models 708A-708N that may be different from the first neural network model 702. For example, each of the first neural network model 702 and the plurality of second neural network models 708A-708N may be trained on different types of training data points (for example trained on different labels of images or trained on different labels of other data points like audio data, text data). The plurality of second neural network models 708A-708N may include a first neural network model 708A, a second neural network model 708B, a third neural network model 708C, a fourth neural network model 708D, . . . and an Nth neural network model 708N. As shown in FIG. 7A, the production phase 704 also include the first neural network model 708A and the second neural network model. There is further shown in FIG. 7A, a staging phase 706 that may include the third neural network model 708C, the fourth neural network model 708D, . . . and the Nth neural network model 708N. In an embodiment, the staging phase 706 may correspond to a phase in which one or more neural network models (e.g., the third neural network model 708C, the fourth neural network model 708D, . . . and the Nth neural network model 708N) may be tested prior to the deployment in the real-time production environment. The staging phase 706 may enable a determination of a prediction performance of such one or more neural network models and to select suitable neural network model(s) for the deployment in the real-time production environment (i.e., for the production phase 704). The block diagram 700A may further include a second external data point 710 (for example similar to the first external data point 402B in FIG. 4).

In accordance with an embodiment, the circuitry 202 of the electronic device 102 may be configured to apply the first neural network model 702 and the plurality of second neural network models 708A-708N on the second external data point 710. The first neural network model 702 may be trained on the first plurality of training data points 106. Each of the plurality of second neural network models 708A-708N may be trained on a plurality of training data points which may be same or different from the first plurality of training data points 106. The circuitry 202 may be further configured to determine a plurality of impact scores for the second external data point 710 based on the application of each of the first neural network model 702 and the plurality of second neural network models 708A-708N on the second external data point 710. The plurality of impact scores for the second external data point 710 may indicate an amount of contribution of the first plurality of training data points 106 (of the first neural network model 702) and the plurality of training data points (of each of the plurality of second neural network models 708A-708N) towards prediction of the second external data point 710. The circuitry 202 may determine the plurality of impact scores for the second external data point 710 based on the comparison of features of the second external data point 710 and with corresponding features of training data points, on which the first neural network model 702, and the plurality of second neural network models 708A-708N may be trained (as also described, for example, in FIGS. 3-4).

The circuitry 202 may be further configured to switch a neural network model from the production phase 704 with a neural network model in the staging phase 706 during the runtime usage of the first neural network model 702. In an exemplary implementation, the circuitry 202 may switch the first neural network model 702 in the production phase 704 with the third neural network model 708C (as a selected neural network model in the staging phase 706), based on a determination that an impact score for the second external data point 710 with respect to the third neural network model 708C is more than an impact score for the second external data point 710 with respect to the first neural network model 702. The circuitry 202 may be further configured to control the memory 204 of the electronic device 102 to store the selected neural network model, such as the third neural network model 708C, in the memory 204 of the electronic device 102. In some embodiments, the circuitry 202 may utilize a model impact threshold to control the switching of neural network model between the production phase 704 and the staging phase 706.

The circuitry 202 may switch a neural network model from the staging phase 706 to the production phase 704 based on a determination that an impact of the neural network model for a certain external data point is greater than an impact of a counter-part neural network model in the production phase 704, for the same external data point. Thus, as the switching or movement between the neural network model and the counter-part neural network model is based on the impact determination of the respective neural network models for the same external data point, the production phase 704 may include neural network models that may be capable of more accurate prediction for the particular external data point.

With reference to FIG. 7B, there is shown a block diagram 700B that may include the electronic device 102 The production phase 704 may include the first neural network model 702, and further include the first neural network model 708A, and the second neural network model 708B of the plurality of second neural network models 708A-708N. The staging phase 706 may include the third neural network model 708C, the fourth neural network model 708D, . . . and the Nth neural network model 708N, similar to FIG. 7A.

The block diagram 700B represents a selection of a new neural network model from the staging phase 706 for addition in the production phase 704 at a runtime usage of the first neural network model 702. In accordance with an embodiment, the circuitry 202 may be configured to select a neural network model, such as the third neural network model 708C, from the staging phase 706 and add the selected neural network model in the production phase 704. The selection of the neural network model and the addition of the selected neural network model to the production phase 704 may be based on a determination of a plurality of impact scores for the second external data point 710 with respect to each of the plurality of second neural network models 708A-708N. In accordance with an embodiment, the circuitry 202 of the electronic device 102 may be configured to apply the plurality of second neural network models 708A-708N on the second external data point 710. As previously discussed, each of the plurality of second neural network models 708A-708N may be trained on a plurality of training data points. The circuitry 202 may be further configured to determine the plurality of impact scores for the second external data point 710 based on the application of each of the plurality of second neural network models 708A-708N on the second external data point 710. The plurality of impact scores for the second external data point 710 may indicate an amount of contribution of the plurality of training data points (of each of the plurality of second neural network models 708A-708N) towards prediction of the second external data point 710. The circuitry 202 may determine the plurality of impact scores for the second external data point 710 based on the comparison of features of the second external data point 710 and with corresponding features of training data points, on which the plurality of second neural network models 708A-708N may be trained. The circuitry 202 may further select and add the third neural network model 708C to the production phase 704, based on the determination that the impact score of the third neural network model 708C is more than corresponding impact scores of the fourth neural network model 708D, . . . and the Nth neural network model 708N. The circuitry 202 may further control the memory 204 of the electronic device 102 to store the selected third neural network model 708C in the production phase 704 along with the first neural network model 702, and the first neural network model 708A, and the second neural network model 708B of the plurality of second neural network models 708A-708N.

The circuitry 202 may select a neural network model from a group of neural network models present in the staging phase 706 based on a determination that an impact score of the selected neural network model for a certain external data point is greater than an impact score of each of the remaining neural network models in the staging phase 706, for the same external data point. The selected neural network model may thus be a most impactful neural network model for the external data point with respect to the other neural network models in the group of neural network models present in the staging phase 706. After the addition of the new neural network model to the production phase 704, the production phase 704 may include neural network models that may be capable of more accurate prediction for the external data points.

Figure 8:
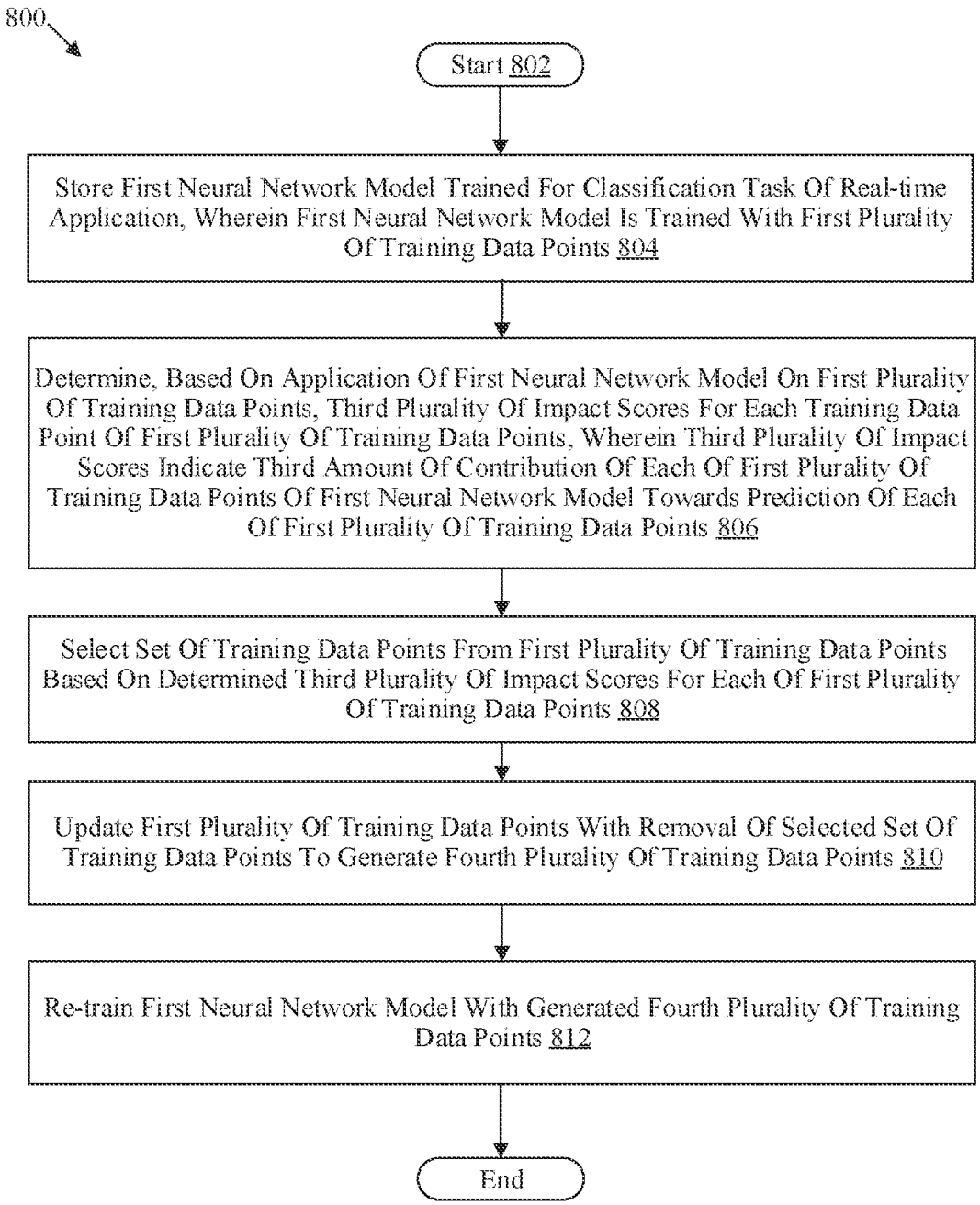
FIG. 8 is a flowchart that illustrates an exemplary method for re-training of the first neural network model based on selection of training data points, in accordance with an embodiment of the disclosure.

FIG. 8 is a flowchart that illustrates an exemplary method for re-training of the first neural network model, based on training data points, in accordance with an embodiment of the disclosure. FIG. 8 is described in conjunction with elements from FIGS. 1, 2, 3, 4, 5, 6, 7A, and 7B. With reference to FIG. 8, there is shown a flowchart 800. The operations of the flowchart 800 may be executed by a computing system, such as the electronic device 102 or the circuitry 202. The operations may start at 802 and proceed to 804.

At 804, the first neural network model 302B trained for a classification task of a real-time application may be stored. In one or more embodiments, the circuitry 202 of the electronic device 102 may be configured to store the first neural network model 302B in a memory (such as, the memory 204) of the electronic device 102, as described, for example, in FIG. 2. The first neural network model 302B may be trained with a first plurality of training data points (such as, the first plurality of training data points 106).

At 806, the third plurality of impact scores for each training data point of the first plurality of training data points 302A may be determined. In accordance with an embodiment, the circuitry 202 of the electronic device 102 may be configured to determine the third plurality of impact scores for each training data point of the first plurality of training data points 302A, based on the application of the first neural network model 302B on the first plurality of training data points 302A, as described, for example, in FIG. 3 (at 302). The third plurality of impact scores may indicate the third amount of contribution of each of the first plurality of training data points 302A of the first neural network model 302B towards prediction of each of the first plurality of training data points 302A.

At 808, the set of training data points may be selected from the first plurality of training data points 302A, based on the determined third plurality of impact scores for each of the first plurality of training data points 302A. In accordance with an embodiment, the circuitry 202 of the electronic device 102 may be configured to select the set of training data points from the first plurality of training data points 302A based on the determined third plurality of impact scores for each of the first plurality of training data points 302A, as described, for example, in FIG. 3 (at 304).

At a 810, the first plurality of training data points 302A may be updated with removal of the selected set of training data points to generate the fourth plurality of training data points. In accordance with an embodiment, the circuitry 202 of the electronic device 102 may be configured to update the first plurality of training data points 302A with removal of the selected set of training data points to generate the fourth plurality of training data points, as described, for example, in FIG. 3 (at 306 and 308).

At 812, the first neural network model 302B may be re-trained with the generated fourth plurality of training data points. In accordance with an embodiment, the circuitry 202 of the electronic device 102 may be configured to re-train the first neural network model 302B with the generated fourth plurality of training data points, described, for example, in FIG. 3 (at 310). Control may pass to end.

Although the flowchart 800 is illustrated as discrete operations, such as 804, 806, 808, 810 and 812, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 9:
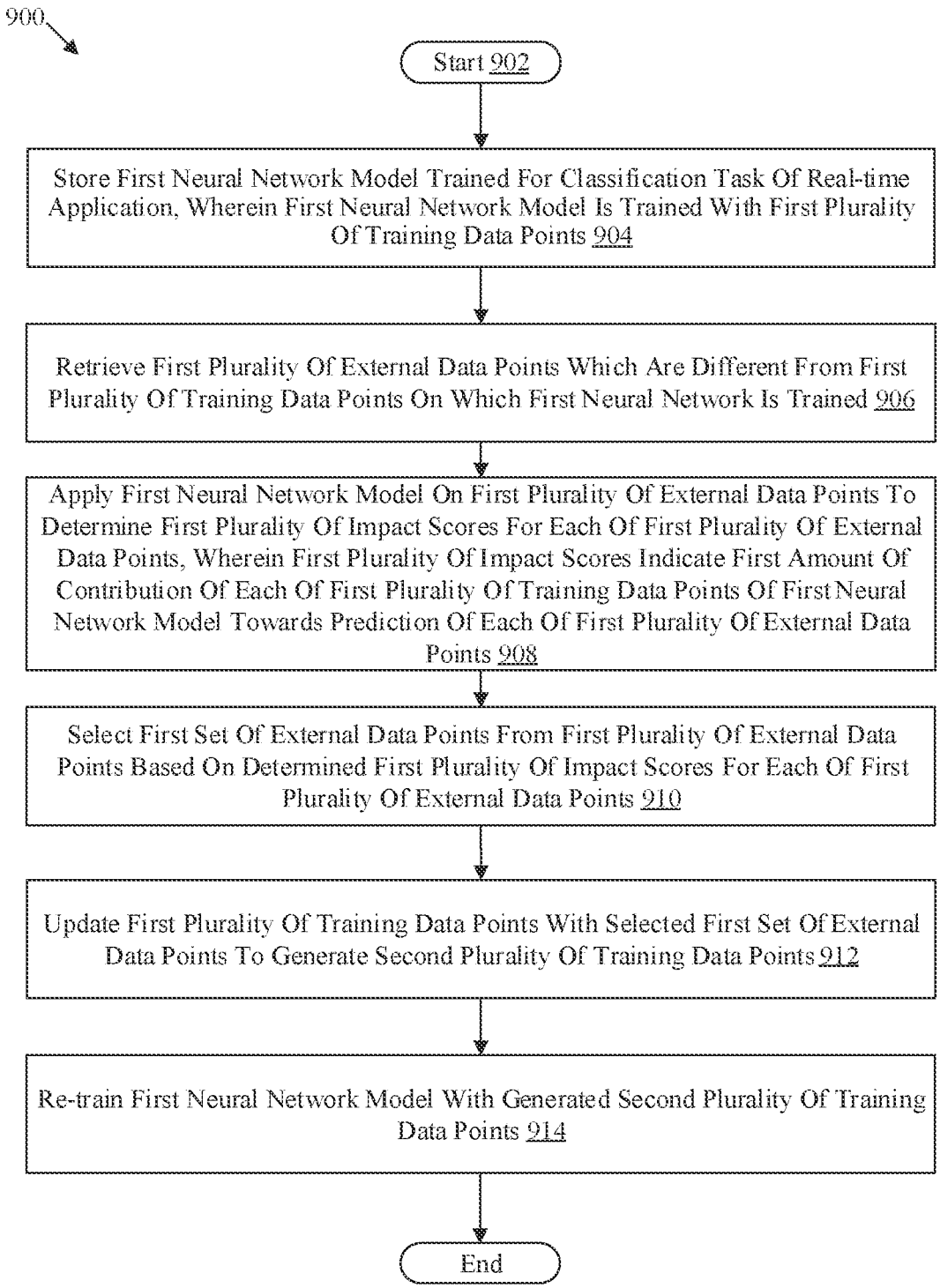
FIG. 9 is a flowchart that illustrates an exemplary method for re-training of the first neural network model based on selection of external data points, in accordance with an embodiment of the disclosure.

FIG. 9 is a flowchart that illustrates an exemplary method for re-training of the first neural network model, in accordance with an embodiment of the disclosure. FIG. 9 is described in conjunction with elements from FIGS. 1, 2, 3, 4, 5, 6, 7A, 7B, and 8. With reference to FIG. 9, there is shown a flowchart 900. The operations of the flowchart 900 may be executed by a computing system, such as the electronic device 102 or the circuitry 202. The operations may start at 902 and proceed to 904.

At 904, the first neural network model 404A trained for a classification task of a real-time application may be stored. In one or more embodiments, the circuitry 202 of the electronic device 102 may be configured to store the first neural network model 404A in a memory (such as, the memory 204) of the electronic device 102, as described, for example, in FIG. 2. The first neural network model 104 may be trained with a first plurality of training data points (such as, the first plurality of training data points 106).

At 906, the first plurality of external data points 402A may be retrieved. The first plurality of external data points 402A (or the first plurality of external data points 110) may be different from the first plurality of training data points 412 on which the first neural network model 404A may be trained. In one or more embodiments, the circuitry 202 of the electronic device 102 may be configured to retrieve the first plurality of external data points 402A (i.e. external data) from the database 108, as described, for example, in FIG. 4 (at 402).

At 908, the first neural network model 404A may be applied on the first plurality of external data points 402A to determine a first plurality of impact scores for each of the first plurality of external data points 402A. In one or more embodiments, the circuitry 202 of the electronic device 102 may be configured to apply the first neural network model 404A on the first plurality of external data points 402A to determine the first plurality of impact scores (such as, the impact score 414A, the impact score 414B and the impact score 414C) for each of the first plurality of external data points 402A, as described, for example, in FIG. 4 (at 404). The first plurality of impact scores may indicate a first amount of contribution or impact/influence of each of the first plurality of training data points 412 of the first neural network model 404A towards prediction of each of the first plurality of external data points 402A.

At 910, a first set of external data points may be selected from the first plurality of external data points 402A based on the determined first plurality of impact scores for each of the first plurality of external data points 402A. In one or more embodiments, the circuitry 202 of the electronic device 102 may be configured to select the first set of external data points (such as the first external data point 402B) from the first plurality of external data points 402A based on the determined first plurality of impact scores for each of the first plurality of external data points 502A, as described, for example, in FIG. 4 (at 406).

At 912, the first plurality of training data points 412 may be updated with the selected first set of external data points (such as, the first external data point 402B) to generate a second plurality of training data points. In one or more embodiments, the circuitry 202 of the electronic device 102 may be configured to update the first plurality of training data points 412 by addition of the selected first set of external data points (such as, the first external data point 402B) to generate a second plurality of training data points, as described, for example, in FIG. 4 (at 408).

At 914, the first neural network model 404A may be re-trained with the generated second plurality of training data points. In one or more embodiments, the circuitry 202 of the electronic device 102 may be configured to re-train the first neural network model 404A with the generated second plurality of training data points, as described, for example, in FIG. 4 (at 410). Control may pass to end.

Although the flowchart 900 is illustrated as discrete operations, such as 904, 906, 908, 910, 912 and 914, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 10:
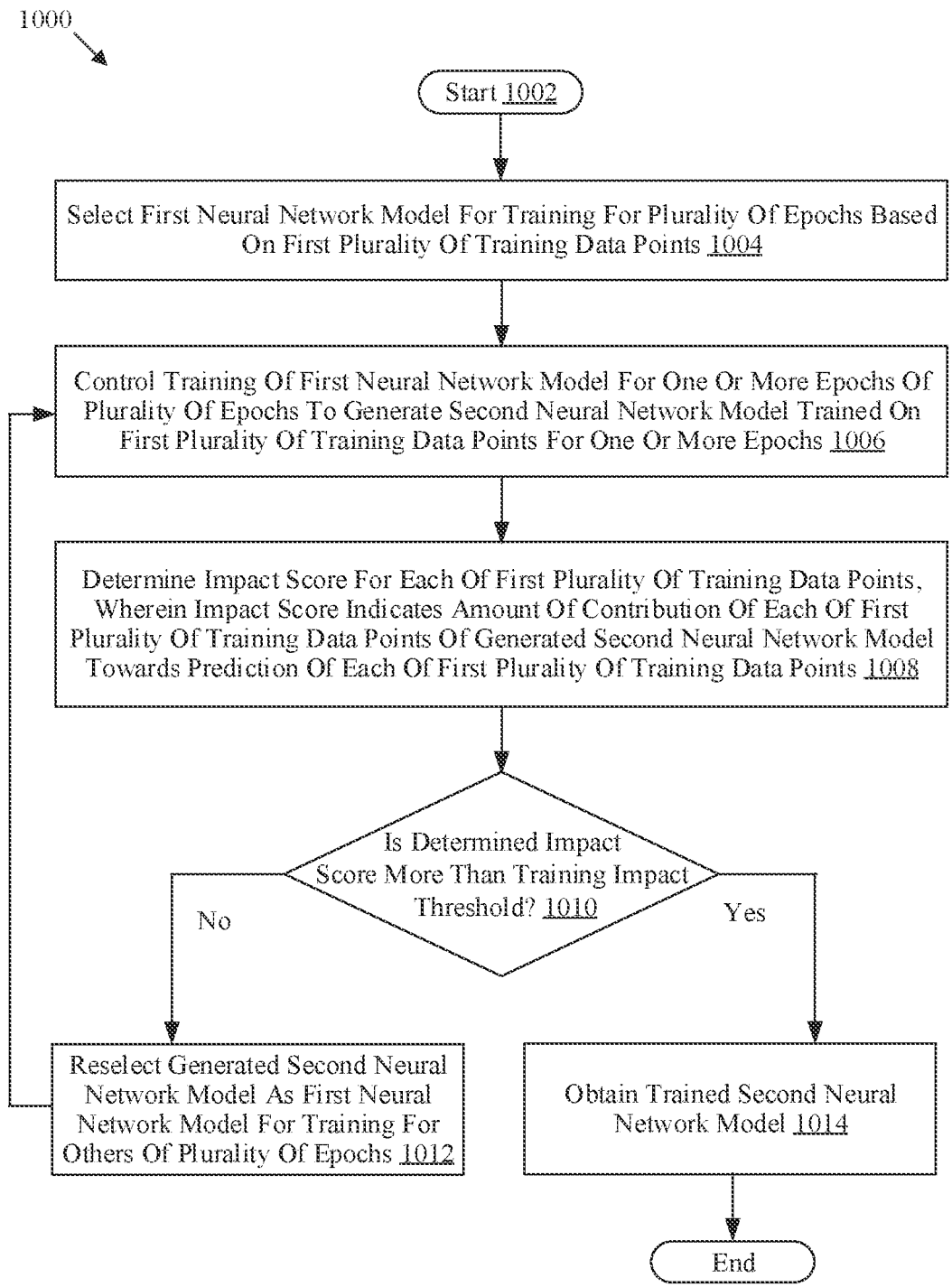
FIG. 10 is a flowchart that illustrates an exemplary method for dynamic tracking of the first neural network model, in accordance with an embodiment of the disclosure.

FIG. 10 is a flowchart that illustrates an exemplary method for dynamic tracking of the first neural network model, in accordance with an embodiment of the disclosure. FIG. 10 is described in conjunction with elements from FIGS. 1, 2, 3, 4, 5, 6, 7A, 7B, 8, and 9. With reference to FIG. 10, there is shown a flowchart 1000. The operations of the flowchart 1000 may be executed by a computing system, such as the electronic device 102 or the circuitry 202. The operations may start at 1002 and proceed to 1004.

At 1004, a first neural network model may be selected for training for a plurality of epochs based on a first plurality of training data points. In accordance with an embodiment, the circuitry 202 may be configured to select the first neural network model 604 for training for the plurality of epochs, (such as, the first set of epochs 608A and the second set of epochs 608B) based on the first plurality of training data points 606, as described, for example, in FIG. 6.

At 1006, the training of the first neural network model 604 may be controlled for one or more epochs of the plurality of epochs to generate a second neural network model trained on the first plurality of training data points 606 for the one or more epochs. In accordance with an embodiment, the circuitry 202 may be configured to control the training of the first neural network model 604 for the one or more epochs, (such as the first set of epochs 608A of the plurality of epochs), to generate the second neural network model trained on the first plurality of training data points 606 for the one or more epochs. The control of the training of the first neural network model 604 for the one or more epochs to generate the second neural network model, is described, for example, in FIG. 6.

At 1008, an impact score may be determined for each of the first plurality of training data points 606. The impact score may indicate an amount of contribution (or impact) of each of the first plurality of training data points 606 of the generated second neural network model towards a prediction of each of the first plurality of training data points 606. In accordance with an embodiment, the circuitry 202 may be configured to determine the impact score, such as the first set of impact scores 610A, for each of the first plurality of training data points 606 for the first set of epochs 608A. The determination of the impact score for each of the first plurality of training data points 606, is described, for example, in FIG. 6.

At 1010, it may be determined whether the determined impact score (at 1008) is greater than a training impact threshold. In accordance with an embodiment, the circuitry 202 may be configured to determine whether the determined impact score, (such as the first set of impact scores 610A), is more than the training impact threshold or not, as described, for example, in FIG. 6. In case it is determined that the determined impact score is greater than the training impact threshold, control may pass to 1014. Otherwise, control may pass to 1012.

At 1012, the generated second neural network model may be re-selected as the first neural network model 604 for training for others of the plurality of epochs, if the first set of impact scores 610A is less than the training impact threshold. In accordance with an embodiment, the circuitry 202 may be configured to re-select the generated second neural network model as the first neural network model 604 for training for others (such as the second set of epochs 608B) of the plurality of epochs, if the first set of impact scores 610A is less than the training impact threshold as described, for example, in FIG. 6. Control may pass to 1006 and the circuitry 202 may be configured to iterate the operations from 1006.

At 1014, the trained second neural network model may be obtained based on iterative control of the set of operations based on the comparison. In accordance with an embodiment, the circuitry 202 may be configured to obtain the trained second neural network model based on iterative control of the set of operations (at 1006-1010) based on the comparison (i.e. the first set of impact scores 610A is more than the training impact threshold performed at 1010). Control may pass to end.

Although the flowchart 1000 is illustrated as discrete operations, such as 1004, 1006, 1008, 1010, 1012, and 1014, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by an electronic device (e.g., the electronic device 102), may cause the electronic device 102 to execute operations. The operations may include storage of a first neural network model (such as the first neural network model 104) trained for a classification task of a real-time application. The first neural network model 104 may be trained with a first plurality of training data points (such as the first plurality of training data points 106). The operations may further include retrieval of a first plurality of external data points (such as the first plurality of external data points 110), which may be different from the first plurality of training data points 106 on which the first neural network model 104 may be trained. The operations may further include application of the first neural network model 104 on the first plurality of external data points 110 to determine a first plurality of impact scores for each of the first plurality of external data points 110. The first plurality of impact scores may indicate a first amount of contribution of each of the first plurality of training data points 106 of the first neural network model 104 towards a prediction of each of the first plurality of external data points 110. The operations may further include selection of a first set of external data points from the first plurality of external data points 110 based on the determined first plurality of impact scores for each of the first plurality of external data points 110. Further, the operations may include update of the first plurality of training data points 106 with the selected first set of external data points to generate a second plurality of training data points. The operations may further include re-training of the first neural network model 104 with the generated second plurality of training data points.

Various embodiments of the disclosure may provide a non-transitory computer-readable medium having stored thereon, computer-executable instructions that when executed by an electronic device (e.g., the electronic device 102), may cause the electronic device 102 to execute operations. The operations may include storage of a first neural network model (such as the first neural network model 604) trained for a classification task of a real-time application. The operations may further include selection of the first neural network model 604 for training for a plurality of epochs based on a first plurality of training data points (such as, the first plurality of training data points 606). The operations may further include a control of a set of operations for training the selected first neural network model 604. The set of operations may include control of the training of the first neural network model 604 for one or more epochs of the plurality of epochs to generate a second neural network model trained on the first plurality of training data points 606 for the one or more epochs. The set of operations may further include determination of an impact score for each of the first plurality of training data points 606. The impact score may indicate an amount of contribution of each of the first plurality of training data points 606 of the generated second neural network model towards a prediction of each of the first plurality of training data points 606. The set of operations may further include a re-selection of the generated second neural network model as the first neural network model 604 for training for others of the plurality of epochs, based on a comparison between the determined impact score and a training impact threshold. The operations may further include obtaining the trained second neural network model based on iterative control of the set of operations based on the comparison.

Exemplary aspects of the disclosure may include an electronic device (such as the electronic device 102). The electronic device 102 may include a memory (such as the memory 204) configured to store a first neural network model (such as the first neural network model 104) that may be trained for a classification task of a real-time application. The first neural network model 104 may be trained with a first plurality of training data points (such as the first plurality of training data points 106). The electronic device 102 may further include circuitry (such as the circuitry 202) communicatively coupled to the memory 204. The circuitry 202 may be configured to retrieve a first plurality of external data points (such as the first plurality of external data points 110) which may be different from the first plurality of training data points 106 on which the first neural network model 104 may be trained. The circuitry 202 may be further configured to apply the first neural network model 104 on the first plurality of external data points 110 to determine a first plurality of impact scores for each of the first plurality of external data points 110. The first plurality of impact scores may indicate a first amount of contribution of each of the first plurality of training data points 106 of the first neural network model 104 towards a prediction of each of the first plurality of external data points 110. The circuitry 202 may be further configured to select a first set of external data points from the first plurality of external data points 110 based on the determined first plurality of impact scores for each of the first plurality of external data points 110. The circuitry 202 may be further configured to update the first plurality of training data points 106 with the selected first set of external data points to generate a second plurality of training data points. The circuitry 202 may be further configured to re-train the first neural network model 104 with the generated second plurality of training data points.

In accordance with an embodiment, the circuitry 202 may be configured to apply a mathematical function to the determined first plurality of impact scores. The mathematical function comprises one of a maxima function, an average function, a mean function, or a summation function. The circuitry 202 may be further configured to determine a first impact score for each of the first plurality of external data points 110 based on the application of the mathematical function.

In accordance with an embodiment, a first neural network model (such as the first neural network model 404A) may be trained on a first plurality of training data points (such as the first plurality of training data points 412). The circuitry 202 may be configured to apply the first neural network model 404A on each of first plurality of external data points (such as first plurality of external data points 402A), to generate a prediction score for each of the first plurality of external data points 402A. The circuitry 202 may be further configured to select the first set of external data points from the first plurality of external data points 402A based on the determined first impact score and the generated prediction score for each of the first plurality of external data points 502A.

In accordance with an embodiment, the first amount of contribution may indicate a number of features of each of the first plurality of training data points 412 that may have contributed towards the prediction of each of the first plurality of external data points 402A.

In accordance with an embodiment, the circuitry 202 may be configured to select the first set of external data points from the first plurality of external data points 502A based on a first range of impact scores. The impact score for each external data point in the selected first set of external data points may lie within the first range of impact scores.

In accordance with an embodiment, the circuitry 202 may be configured to select the first set of external data points from the first plurality of external data points 402A based on a first impact score threshold. The impact score for each external data point in the selected first set of external data points may lie above the first impact score threshold.

In accordance with an embodiment, the first plurality of training data points 412 and the first plurality of external data points 402A correspond to one of image data, audio data, text data, or three-dimensional (3D) data. In accordance with an embodiment, the real-time application comprises one of an image classification, a speech recognition, or text recognition performed by the first neural network model 104.

In accordance with an embodiment, the circuitry 202 may be further configured to apply a plurality of realistic variations to one or more external data points of a first plurality of external data points (such as, the first plurality of external data points 502A) to generate a second plurality of external data points (such as, the second plurality of external data points 516). The one or more external data points of the generated second plurality of external data points 516 may correspond to different realistic variation of the plurality of realistic variations. The circuitry 202 may be further configured to apply the first neural network model 404A on the generated second plurality of external data points 516 to determine a second plurality of impact scores for each of the generated second plurality of external data points 516. The second plurality of impact scores may indicate a second amount of contribution of each of the first plurality of training data points 412 of the first neural network model 404A towards a prediction of each of the generated second plurality of external data points 516. The circuitry 202 may be further configured to select a second set of external data points from the generated second plurality of external data points 516 based on the determined second plurality of impact scores for each of the generated second plurality of external data points 516. The circuitry 202 may be further configured to update the first plurality of training data points 412 with the selected second set of external data points to generate a third plurality of training data points. The circuitry 202 may be further configured to re-train the first neural network model 404A with the generated third plurality of training data points.

In accordance with an embodiment, the plurality of realistic variations include, but is not limited to, one of: a rotation variation, a horizontal translation variation, a vertical translation variation, a shear variation, a zoom variation, a brightness variation, a contrast variation, a flip variation, a sharpness variation, or a color variation. In accordance with an embodiment, a first variation of a first external data point, of the selected second set of external data points, may be same as a second variation of a second external data point of the selected second set of external data points. The plurality of realistic variations may include the first variation and the second variation.

In accordance with an embodiment, the circuitry 202 may be further configured to determine, based on the application of a first neural network model (such as the first neural network model 302B) on the first plurality of training data points, a third plurality of impact scores for each training data point of the first plurality of training data points (such as, the first plurality of training data points 302A). The third plurality of impact scores may indicate a third amount of contribution of each of the first plurality of training data points 302A of the first neural network model 302B towards prediction of each of the first plurality of training data points 302A. The circuitry 202 may be further configured to select a set of training data points from the first plurality of training data points 302A based on the determined third plurality of impact scores for each of the first plurality of training data points 302A. The circuitry 202 may be further configured to update the first plurality of training data points 302A with removal of the selected set of training data points to generate a fourth plurality of training data points. The circuitry 202 may be further configured to re-train the first neural network model 302B with the generated fourth plurality of training data points.

In accordance with an embodiment, the circuitry 202 may be further configured to select the set of training data points from the first plurality of training data points 302A based on a second impact score threshold. The impact score for each training data point in the selected set of training data points may lie below the second impact score threshold.

In accordance with an embodiment, the circuitry 202 may be further configured to generate a first graphical representation (such as the first graphical representation 302C) that may have a plurality of nodes and a plurality of edges between the plurality of nodes. Each node of the plurality of nodes may represent a training data point of the first plurality of training data points 302A, and each edge of the plurality of edges represents an impact score which indicates the third amount of contribution of each of the first plurality of training data points 302A of the first neural network model 302B towards prediction of the corresponding training data point.

In accordance with an embodiment, the circuitry 202 may be further configured to apply the re-trained first neural network model 104 on the selected first set of external data points to generate a set of prediction scores to validate the prediction for the first set of external data points.

In accordance with an embodiment, the circuitry 202 may be further configured to apply a plurality of second neural network models (such as, the plurality of second neural network models 708A-708N) on a second external data point (such as, the second external data point 710). Each of the plurality of second neural network models 708A-708N may be trained on a plurality of training data points. The circuitry 202 may be further configured to determine, based on the application of each of the plurality of second neural network models 708A-708N on the second external data point 710, a plurality of impact scores for the second external data point 710. The plurality of impact scores may indicate an amount of contribution of the plurality of training data points of each of the plurality of second neural network models 708A-708N towards a prediction of the second external data point 710. The circuitry 202 may be further configured to select a neural network model from the plurality of second neural network models 708A-708N based on the plurality of impact scores determined for the second external data point 710 with respect to the plurality of second neural network models 708A-708N. The circuitry 202 may be further configured to control the memory 204 to store the selected neural network model.

Exemplary aspects of the disclosure may include an electronic device (such as the electronic device 602). The electronic device 602 may include a memory (such as the memory 204) configured to store a first neural network model (such as the first neural network model 604) trained for a classification task of a real-time application. The electronic device 602 may further include circuitry (such as the circuitry 202) communicatively coupled to the memory 204. The circuitry 202 may be configured to select the first neural network model 604 for training for a plurality of epochs based on a first plurality of training data points (such as, the first plurality of training data points 606). The circuitry 202 may be configured to control a set of operations for training the selected first neural network model 604. The set of operations may include control of the training of the first neural network model 604 for one or more epochs of the plurality of epochs to generate a second neural network model trained on the first plurality of training data points 606 for the one or more epochs. The set of operations may further include determination of an impact score for each of the first plurality of training data points 606. The impact score may indicate an amount of contribution of each of the first plurality of training data points 606 of the generated second neural network model towards a prediction of each of the first plurality of training data points 606. The set of operations may further include a re-selection of the generated second neural network model as the first neural network model 604 for training for others of the plurality of epochs, based on a comparison between the determined impact score and a training impact threshold. The circuitry 202 may be further configured to obtain the trained second neural network model based on iterative control of the set of operations based on the comparison.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   a memory configured to store:
      a first plurality of training data points; and
      a first neural network model trained for a classification task of a real-time application,
         wherein the first neural network model is trained with the first plurality of training data points; and
   circuitry communicatively coupled to the memory, wherein the circuitry is configured to:
      retrieve a first plurality of external data points which are different from the first plurality of training data points on which the first neural network model is trained;
      apply the first neural network model on the first plurality of external data points to determine a first plurality of impact scores for each external data point of the first plurality of external data points,
         wherein the determined first plurality of impact scores indicate a first amount of contribution of each training data point of the first plurality of training data points of the first neural network model towards prediction of a label of each external data point of the first plurality of external data points;
      determine a first impact score for each external data point of the first plurality of external data points based on the determined first plurality of impact scores;
      select a first set of external data points from the first plurality of external data points based on the determined first impact score for each external data point of the first set of external data points,
         wherein the determined first impact score for each external data point of the first set of external data points is above a first impact score threshold;
      update the first plurality of training data points stored in the memory with the selected first set of external data points to generate a second plurality of training data points; and
      re-train the first neural network model with the generated second plurality of training data points.

2. The electronic device according to claim 1, wherein the circuitry is further configured to:
   apply a mathematical function to the determined first plurality of impact scores,
      wherein the mathematical function comprises one of a maxima function, an average function, a mean function, or a summation function; and
   determine the first impact score for each external data point of the first plurality of external data points based on the application of the mathematical function.

3. The electronic device according to claim 2, wherein the circuitry is further configured to:
   apply the first neural network model on each external data point of the first plurality of external data points to generate a prediction score for each external data point of the first plurality of external data points; and
   select the first set of external data points from the first plurality of external data points based on the generated prediction score for each external data point of the first plurality of external data points.

4. The electronic device according to claim 1, wherein the first amount of contribution indicates a number of features of each training data point of the first plurality of training data points contributed towards the prediction of the label of each external data point of the first plurality of external data points.

5. The electronic device according to claim 1, wherein the circuitry is further configured to select the first set of external data points from the first plurality of external data points based on a first range of impact scores, and the first impact score for each external data point of the selected first set of external data points lies within the first range of impact scores.

6. The electronic device according to claim 1, wherein the first plurality of training data points and the first plurality of external data points correspond to one of image data, audio data, text data, or three-dimensional (3D) data.

7. The electronic device according to claim 1, wherein the real-time application comprises one of an image classification, a speech recognition, or text recognition performed by the first neural network model.

8. The electronic device according to claim 1, wherein the circuitry is further configured to:
   apply a plurality of variations to an external data point of the first plurality of external data points to generate a second plurality of external data points, wherein a first variation of a first external data point of the generated second plurality of external data points is different from a second variation of a second external data point of the generated second plurality of external data points, and the plurality of variations include the first variation and the second variation;

apply the first neural network model on the generated second plurality of external data points to determine a second plurality of impact scores for each external data point of the generated second plurality of external data points, wherein the determined second plurality of impact scores indicate a second amount of contribution of each training data point of the first plurality of training data points of the first neural network model towards prediction of a label of each external data point of the generated second plurality of external data points;

select a second set of external data points from the generated second plurality of external data points based on the determined second plurality of impact scores for each external data point of the generated second plurality of external data points;

update the first plurality of training data points stored in the memory with the selected second set of external data points to generate a third plurality of training data points; and re-train the first neural network model with the generated third plurality of training data points.

9. The electronic device according to claim 8, wherein the first plurality of training data points and the first plurality of external data points correspond to one of image data or three-dimensional (3D) data, and the plurality of variations comprise at least one of a rotation variation, a horizontal translation variation, a vertical translation variation, a shear variation, a zoom variation, a brightness variation, a contrast variation, a flip variation, a sharpness variation, or a color variation.

10. The electronic device according to claim 8, wherein the first plurality of training data points and the first plurality of external data points correspond to audio data, and the plurality of variations comprise at least one of a volume variation, a frequency variation, a tone variation, an audio equitization variation, or audio noise variation.

11. The electronic device according to claim 8, wherein a third variation of a third external data point of the selected second set of external data points is same as a fourth variation of a fourth external data point of the selected second set of external data points, and the plurality of variations include the third variation and the fourth variation.

12. The electronic device according to claim 8, wherein a third variation of a third external data point of the selected second set of external data points is different from a fourth variation of a fourth external data point of the selected second set of external data points, and the plurality of variations include the third variation and the fourth variation.

13. The electronic device according to claim 1, wherein the circuitry is further configured to:

determine, based on the application of the first neural network model on the first plurality of training data points, a third plurality of impact scores for each training data point of the first plurality of training data points, wherein the determined third plurality of impact scores indicate a third amount of contribution of each training data point of the first plurality of training data points of the first neural network model towards prediction of a label of each training data point of the first plurality of training data points;

select a set of training data points from the first plurality of training data points based on the determined third plurality of impact scores for each training data point of the first plurality of training data points;

update the first plurality of training data points with removal of the selected set of training data points to generate a fourth plurality of training data points; and re-train the first neural network model with the generated fourth plurality of training data points.

14. The electronic device according to claim 13, wherein the circuitry is further configured to:

determine a second impact score for each training data point of the first plurality of training data points based on the determined third plurality of impact scores for the first plurality of training data points; and select the set of training data points from the first plurality of training data points based on the determined second impact score for each training data point of the set of training data points that is below a second impact score threshold.

15. The electronic device according to claim 13, wherein the circuitry is further configured to generate a first graphical representation having a plurality of nodes and a plurality of edges between the plurality of nodes, each node of the plurality of nodes represents a corresponding training data point of the first plurality of training data points, and each edge of the plurality of edges represents a corresponding impact score of the determined third plurality of impact scores.

16. The electronic device according to claim 1, wherein the circuitry is further configured to apply the re-trained first neural network model on the selected first set of external data points to generate a set of prediction scores, and the generated set of prediction scores are for validation of the prediction of the label of each external data point of the selected first set of external data points.

17. The electronic device according to claim 1, wherein the circuitry is further configured to:

apply a plurality of second neural network models on a second external data point different from the first plurality of external data points, wherein the plurality of second neural network models are trained on a third plurality of training data points;

determine, based on the application of each neural network model of the plurality of second neural network models on the second external data point, a second plurality of impact scores for the second external data point, wherein the determined second plurality of impact scores indicate a second amount of contribution of the third plurality of training data points of each neural network model of the plurality of second neural network models towards a prediction of a label of the second external data point;

select a second neural network model from the plurality of second neural network models based on the second plurality of impact scores determined for the second external data point; and control the memory to store the selected second neural network model.

18. A method, comprising:

in an electronic device that includes a memory and circuitry communicatively coupled to the memory:

storing, in the memory, by the circuitry, a first plurality of training data points and a first neural network model trained for a classification task of a real-time application, wherein the first neural network model is trained with the first plurality of training data points;

retrieving, by the circuitry, a first plurality of external data points which are different from the first plurality of training data points on which the first neural network model is trained;

applying, by the circuitry, the first neural network model on the first plurality of external data points to determine a first plurality of impact scores for each external data point of the first plurality of external data points, wherein the determined first plurality of impact scores indicate a first amount of contribution of each training data point of the first plurality of training data points of the first neural network model towards prediction of a label of each external data point of the first plurality of external data points;

determining, by the circuitry, a first impact score for each external data point of the first plurality of external data points based on the determined first plurality of impact scores;

selecting, by the circuitry, a first set of external data points from the first plurality of external data points based on the determined first impact score for each external data point of the first set of external data points, wherein the determined first impact score for each external data point of the selected first set of external data points is above a first impact score threshold;

updating, by the circuitry, the first plurality of training data points stored in the memory with the selected first set of external data points to generate a second plurality of training data points; and re-training, by the circuitry, the first neural network model with the generated second plurality of training data points.

19. A non-transitory computer-readable medium having stored thereon computer-executable instructions that, when executed by an electronic device, causes the electronic device to execute operations, the operations comprising:

storing, in a memory of the electronic device, a first plurality of training data points and a first neural network model trained for a classification task of a real-time application, wherein the first neural network model is trained with the first plurality of training data points;

storing the first plurality of training data points in the memory;

retrieving a first plurality of external data points which are different from the first plurality of training data points on which the first neural network model is trained;

applying the first neural network model on the first plurality of external data points to determine a first plurality of impact scores for each external data point of the first plurality of external data points, wherein the determined first plurality of impact scores indicate a first amount of contribution of each training data point of the first plurality of training data points of the first neural network model towards prediction of a label of each external data point of the first plurality of external data points;

determining a first impact score for each external data point of the first plurality of external data points based on the determined first plurality of impact scores;

selecting a first set of external data points from the first plurality of external data points based on the determined first impact score for each external data point of the first set of external data points, wherein the determined first impact score for each external data point of the selected first set of external data points is above a first impact score threshold;

updating the first plurality of training data points stored in the memory with the selected first set of external data points to generate a second plurality of training data points; and re-training the first neural network model with the generated second plurality of training data points.

* * * * *